United States Patent
Nagasawa

(10) Patent No.: US 9,573,554 B2
(45) Date of Patent: Feb. 21, 2017

(54) VEHICLE SEAT

(71) Applicant: Fuji Jukogyo Kabushiki Kaisha, Tokyo (JP)

(72) Inventor: Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/502,727

(22) Filed: Sep. 30, 2014

(65) Prior Publication Data
US 2015/0091281 A1     Apr. 2, 2015

(30) Foreign Application Priority Data
Oct. 1, 2013   (JP) ................................ 2013-206797

(51) Int. Cl.
*B60R 21/2338*   (2011.01)
*B60N 2/42*   (2006.01)
(Continued)

(52) U.S. Cl.
CPC ......... *B60R 21/2338* (2013.01); *B60N 2/4221* (2013.01); *B60N 2/4228* (2013.01); *B60N 2/4249* (2013.01); *B60N 2/42709* (2013.01); *B60N 2/7094* (2013.01); *B60R 21/207* (2013.01); *B60R 2021/23153* (2013.01);
(Continued)

(58) Field of Classification Search
CPC ............... B60R 21/2338; B60R 21/207; B60R 2021/23382; B60R 2021/23153; B60R 2021/23169; B60R 2021/23161; B60N 2/4228
See application file for complete search history.

(56) References Cited

U.S. PATENT DOCUMENTS 5,782,529 A * 7/1998 Miller, III ............. B60R 21/207
280/730.1
5,902,010 A * 5/1999 Cuevas ................ B60N 2/4415
280/730.1
(Continued)

FOREIGN PATENT DOCUMENTS

JP       H10-071915 A     3/1998
JP       10-273000 A     10/1998
(Continued)

OTHER PUBLICATIONS

Japanese Office Action dated Aug. 25, 2015 with English Translation.

*Primary Examiner* — Darlene P Condra
(74) *Attorney, Agent, or Firm* — McGinn IP Law Group, PLLC

(57) ABSTRACT

A plurality of elastic support members extends across a seat back frame that forms a skeleton of a seat back of the vehicle seat. A seat pad is disposed on the front sides of the elastic support members. An airbag is disposed between the elastic support members and a back portion of a covering in a deflated state. After having deployed, the airbag has such a shape that a deployment amount, in a front-back direction, of the airbag near a side of the seat back is greater than that near a center of the seat back. In a collision or the like, the airbag deploys in the seat back in such a way that, after having deployed, the airbag elastically supports an upper body of an occupant and elastically receives an impact force applied to a back surface of the seat back.

7 Claims, 26 Drawing Sheets

(51) Int. Cl.
  *B60R 21/207* (2006.01)
  *B60N 2/70* (2006.01)
  *B60N 2/427* (2006.01)
  *B60R 21/231* (2011.01)

(52) U.S. Cl.
  CPC ............... *B60R 2021/23161* (2013.01); *B60R 2021/23169* (2013.01); *B60R 2021/23382* (2013.01)

(56) References Cited

U.S. PATENT DOCUMENTS

| | | | |
|---|---|---|---|
| 2005/0184490 A1* | 8/2005 | Itoga | B60N 2/42718 280/730.1 |
| 2010/0230941 A1* | 9/2010 | Hirth | B60R 21/02 280/733 |
| 2011/0241394 A1* | 10/2011 | Yamaguchi | B60N 2/4228 297/216.14 |

FOREIGN PATENT DOCUMENTS

| | | |
|---|---|---|
| JP | 2007-320361 A | 12/2007 |
| JP | 2008-207661 A | 9/2008 |
| JP | 2010-052621 A | 3/2010 |
| JP | 2011-051526 A | 3/2011 |

* cited by examiner

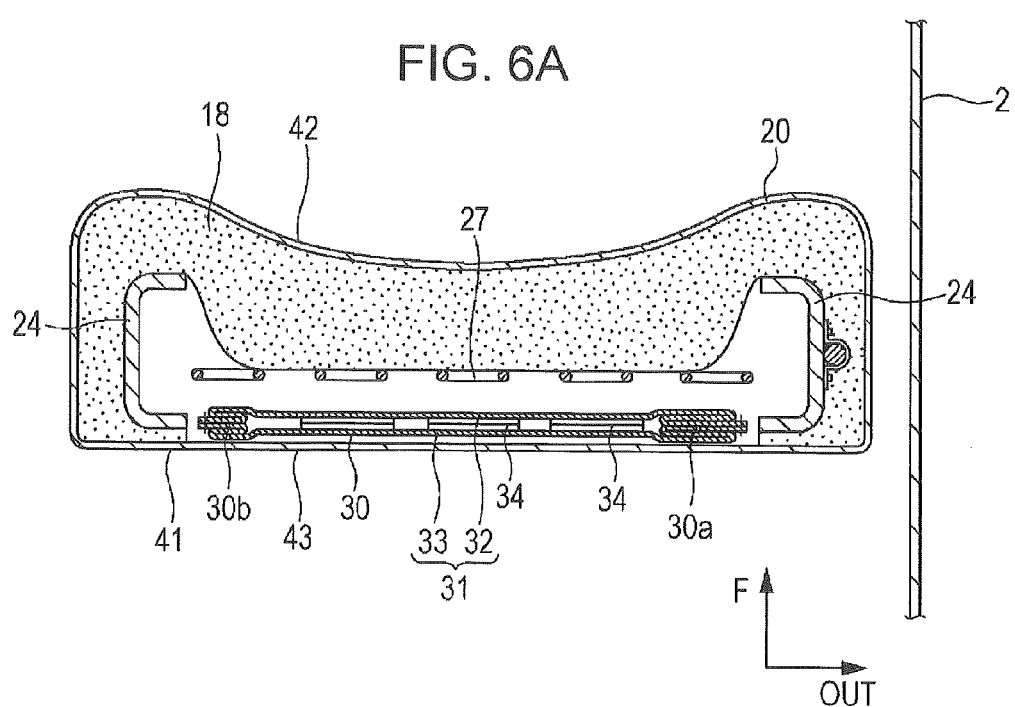
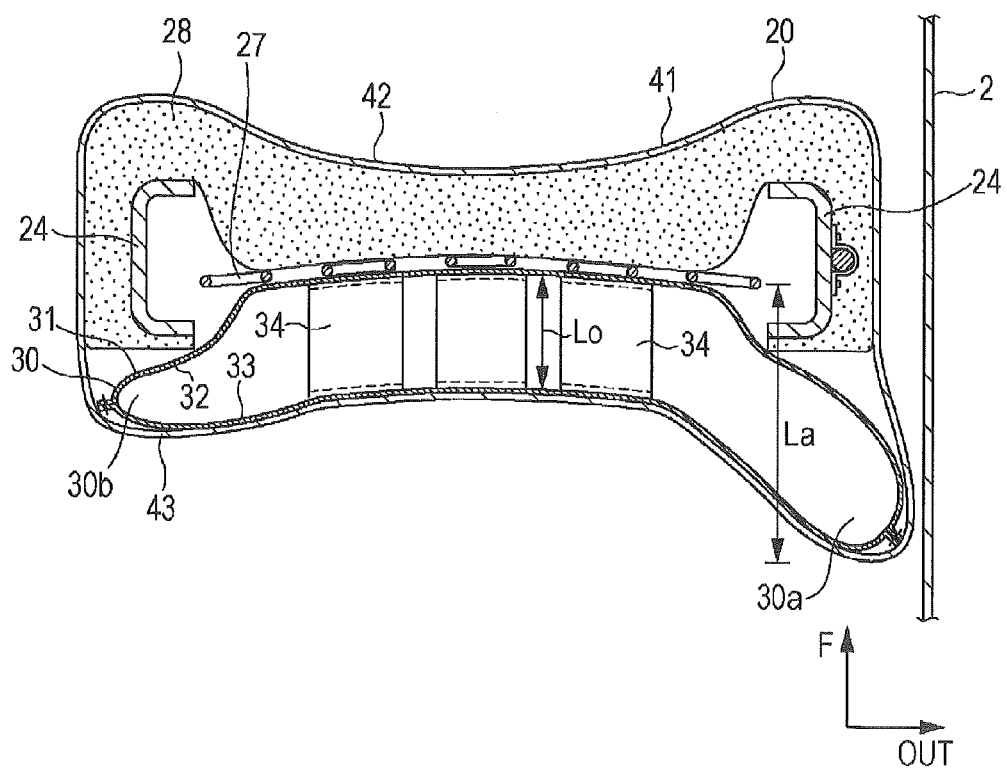

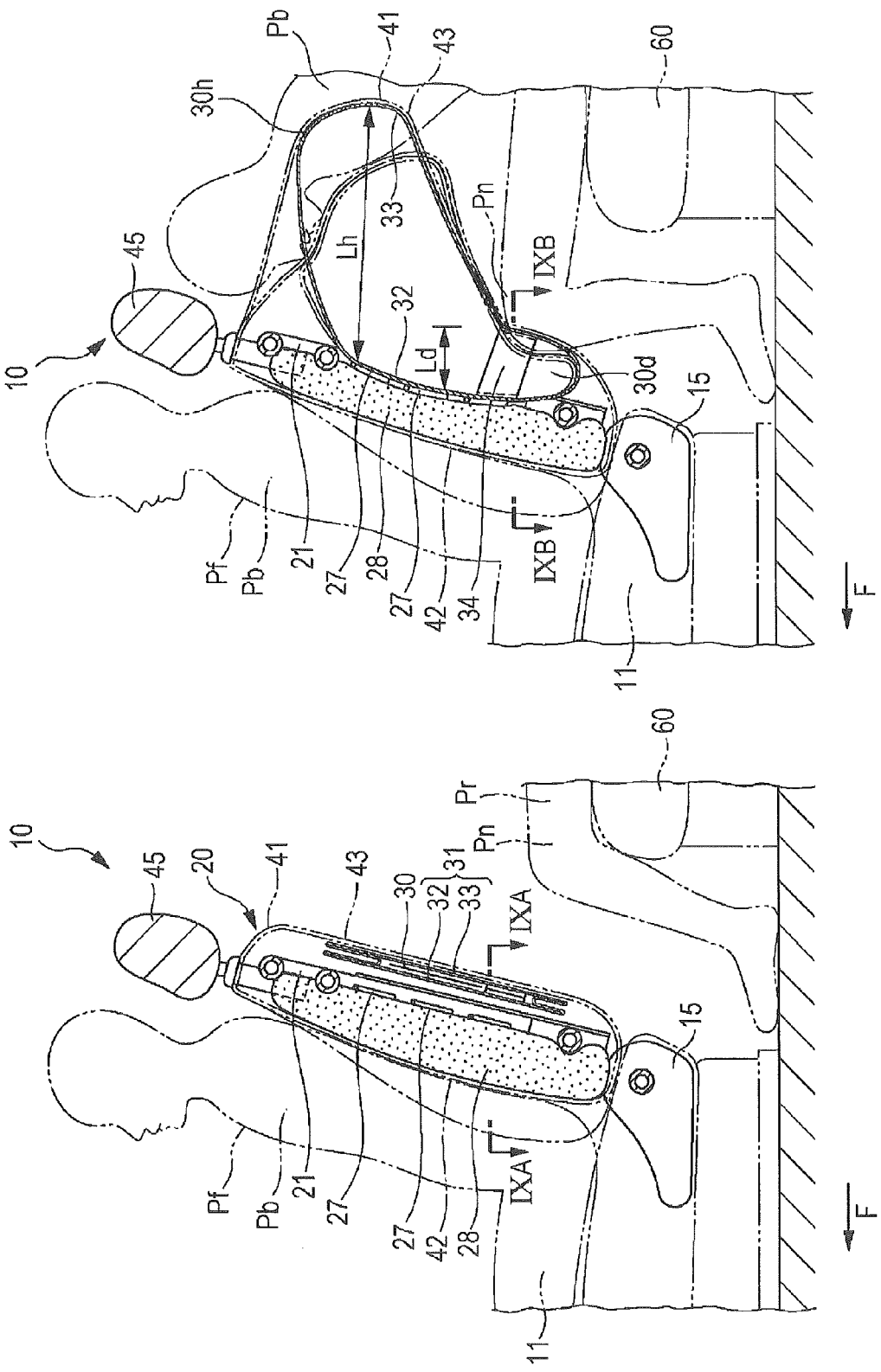

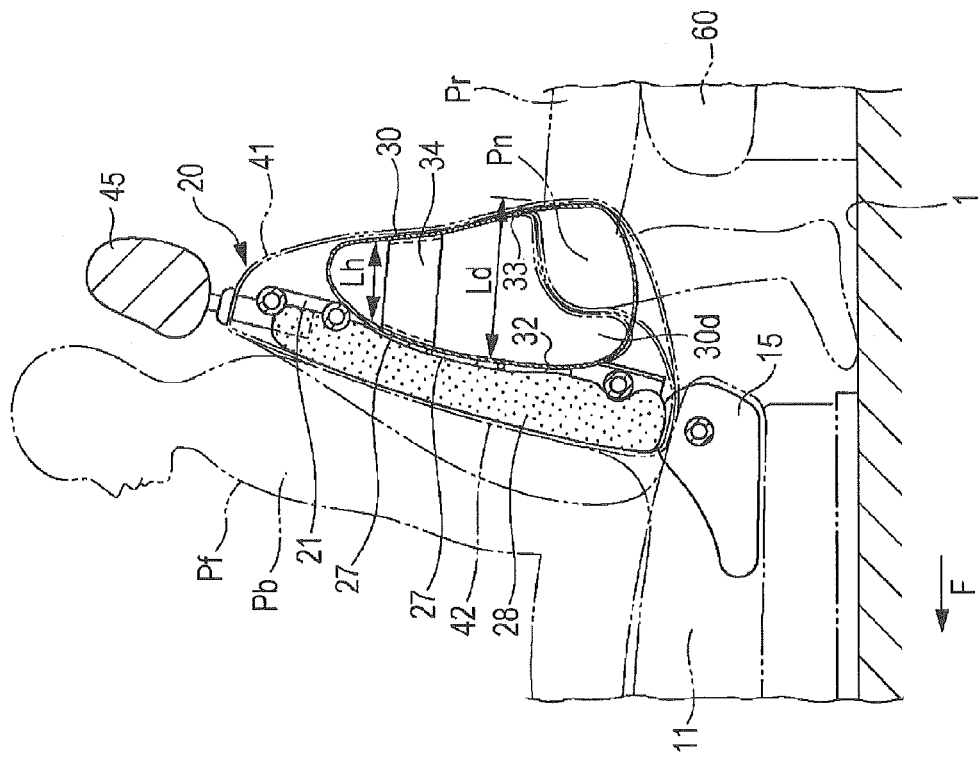
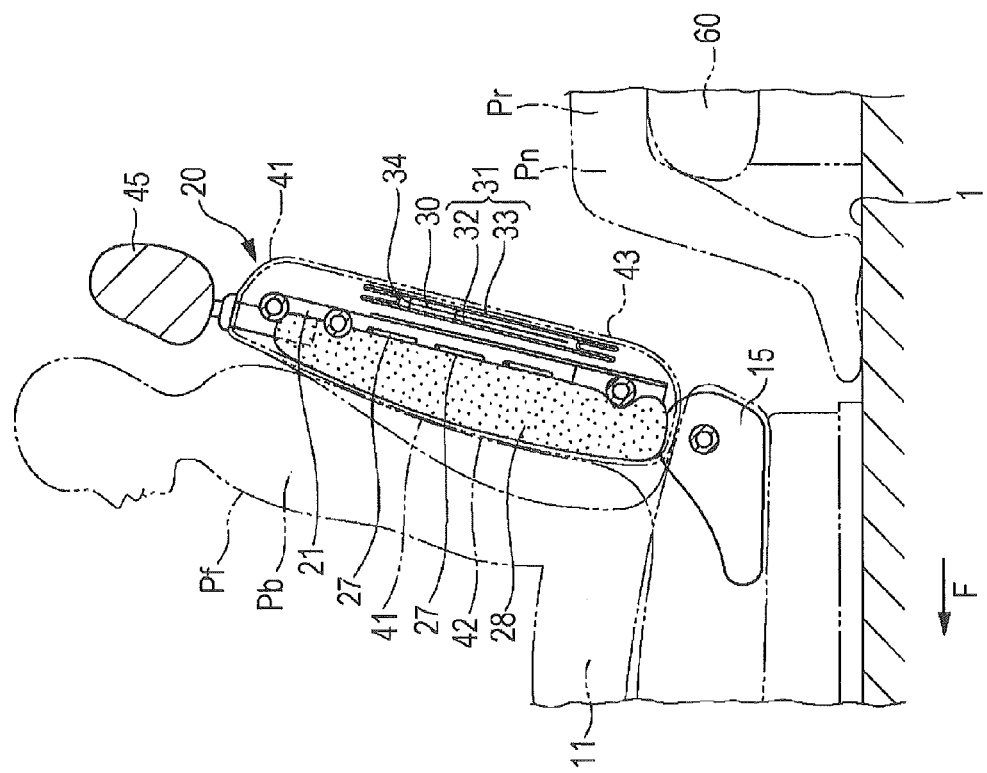

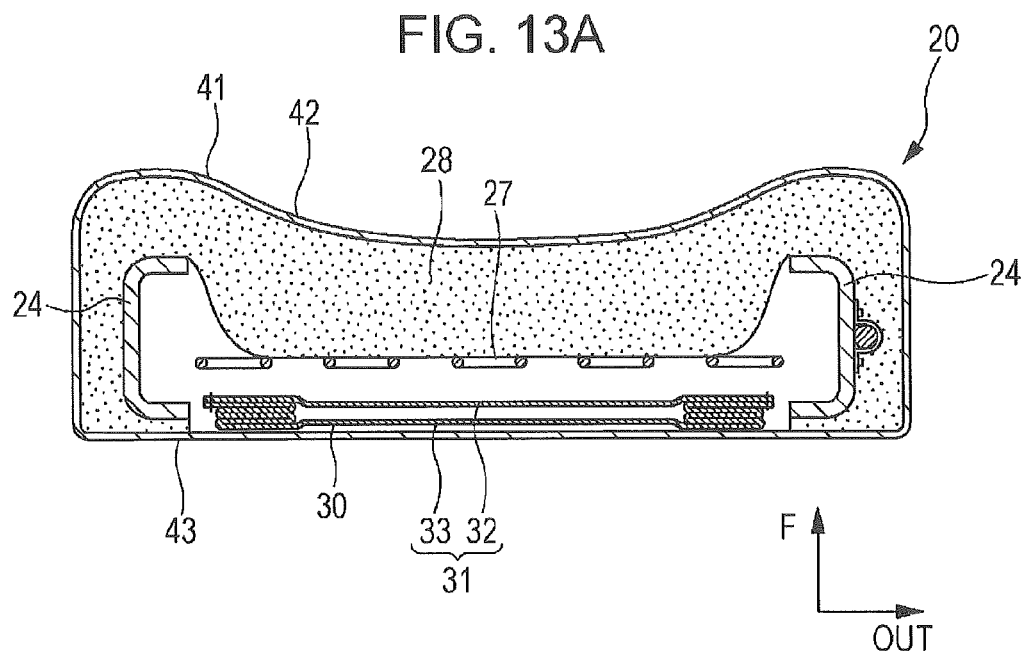
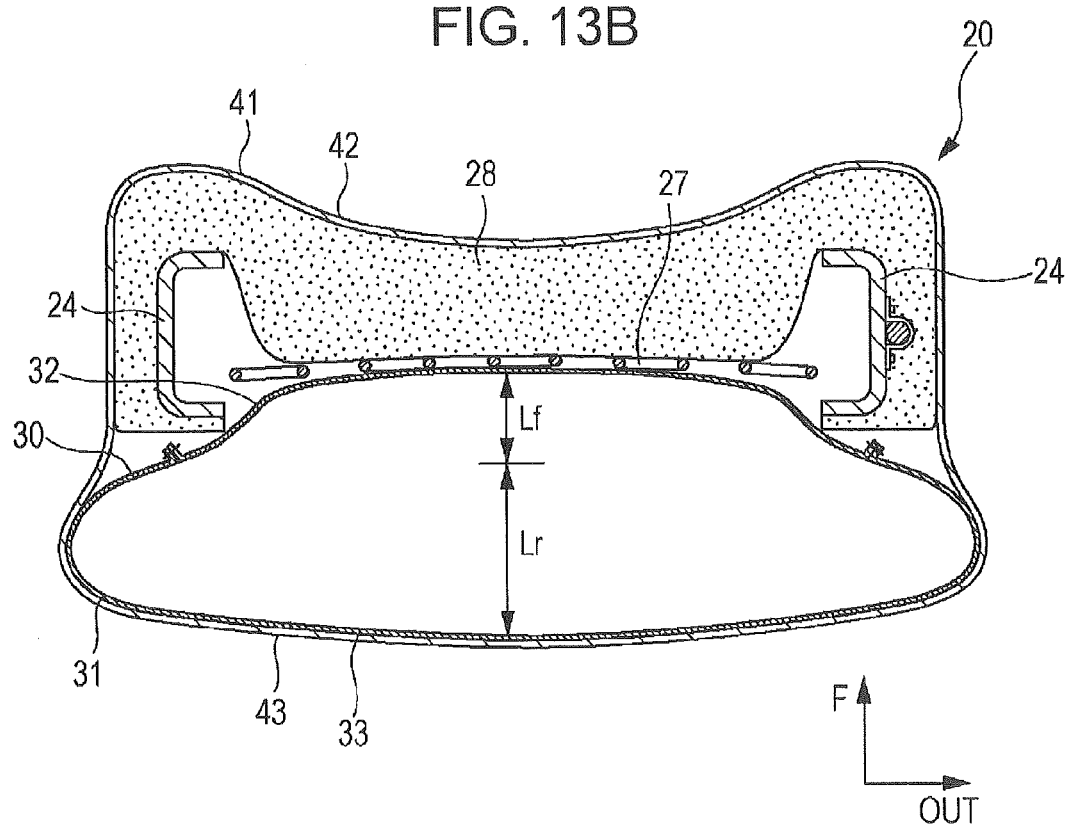

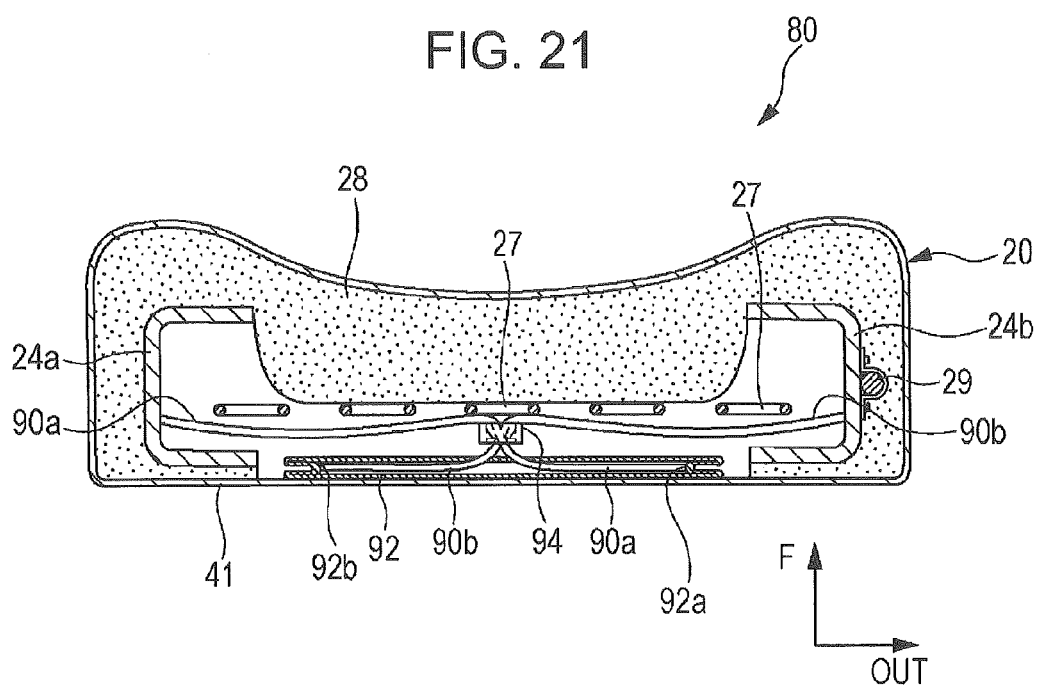
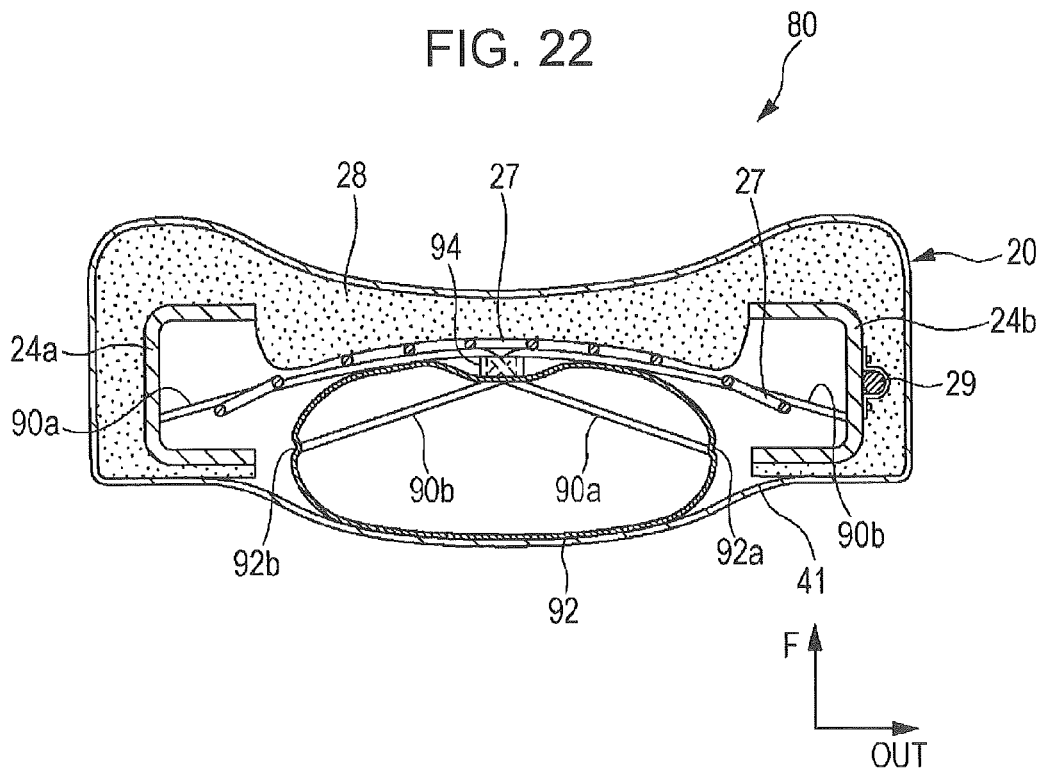

VEHICLE SEAT

CROSS-REFERENCE TO RELATED APPLICATIONS

The present application claims priority from Japanese Patent Application No. 2013-206797 filed on Oct. 1, 2013, the entire contents of which are hereby incorporated by reference.

BACKGROUND

1. Technical Field

The present invention relates to a vehicle seat, and, in particular, to a vehicle seat including a seat back and an airbag disposed in the seat back.

2. Related Art

Regarding vehicle seats of automobiles or the like, airbag systems are known that protect an occupant in a vehicle seat from an impact of a collision by deploying an airbag disposed in a seat back.

For example, Japanese Unexamined Patent Application Publication (JP-A) 10-273000 describes a vehicle seat including a seat back frame, an elastic support member extending across the seat back frame, a seat pad disposed on a front surface of the elastic support member, a support plate disposed behind the elastic support member and having a rigid structure, and an airbag in a deflated state disposed in a space between the elastic support member and the support plate.

With the vehicle seat, when an impact of a predetermined level or greater is detected, an inflator is activated to deploy the airbag between the elastic support member and the support plate. Thus, during a collision, the airbag elastically supports backward movement of an occupant from behind and restrains the occupant, and absorbs the impact energy by being depressurized and deflated.

JP-A 2010-52621 describes an airbag device including a first airbag and a second airbag. The first airbag is disposed in a lower back part of a seat back of a front seat and deploys toward an occupant in a rear seat. The second airbag, which is in a flat state, is disposed in a space in the seat back of the front seat, the space being on the front side of an elastic support member extending across a seat back frame.

Thus, when an impact of a predetermined level or greater is detected, an inflator is activated to deploy the first airbag toward the occupant in the rear seat. Therefore, even if the occupant in the rear seat is moved forward by an impact during a collision, the occupant is prevented from strongly colliding with the back surface of the front seat. Moreover, the second airbag deploys so as to elastically support backward movement of the upper body of an occupant in the front seat during a collision from behind and protects the occupant. The timings at which the first and second airbags are deployed are controlled so as to appropriately protect the occupants.

As described above, the vehicle seat described in JP-A 10-273000 protects an occupant in the vehicle seat by using an airbag and a support plate, which is disposed behind and outside of the airbag and which has a rigid structure. To be specific, the airbag alleviates an impact due to backward movement of the occupant, and the support plate first receives an impact exerted from behind the seat back and then the airbag absorbs the impact.

Accordingly, in a case where the vehicle seat is a front seat, if an occupant in a rear seat collides with the front seat from behind the seat back, a considerable impact is generated when the occupant collides with the support plate. Accordingly, an impact from behind might not be gently received, and therefore not only may the occupant in the rear seat receive considerable damage to a knee or the like but also the occupant in the front seat may receive a considerable impact.

On the other hand, the airbag device described in JP-A 2010-52621 can protect an occupant in a front seat and reduce damage to the occupant because the second airbag deploys in the seat back of the front seat. Moreover, the airbag device can protect an occupant in a rear seat because the first airbag deploys toward the occupant in the rear seat. However, it is necessary not only to provide the second airbag in the seat back but also to provide the first airbag, which deploys backward and outward from the seat back, in the lower part of the seat back of the front seat. Therefore, the structure of the seat back becomes complex, and it becomes difficult to control the airbags.

Moreover, because the first airbag deploys by a large amount in a direction diagonally upward from a lower back part of the seat back of the front seat toward an occupant in the rear seat, the deployment shape of the first airbag becomes unstable. Therefore, the airbag device might not be able to stably and reliably receive and absorb an impact extorted on the occupant in the rear seat when the occupant collides with the seat back of the front seat.

As described above, in each of the structures of the related art documents, there is room for improvement in directly protecting an occupant in the front seat and protecting the occupant from an impact exerted from behind the seat back by using an airbag and a simple structure.

Note that, in vehicles, such as automobiles, a collision of a knee or the like of an occupant in a rear seat with the seat, back of a front seat may occur not only during a frontal collision but also during a rear-end collision in the following situation: a situation where a rear part of the vehicle body becomes deformed during a rear-end collision and an occupant in a rear seat is pushed forward due to the deformation and a knee of the occupant strongly collides with the back surface of the seat back of the front seat.

SUMMARY OF THE INVENTION

The present invention provides a vehicle seat that can directly protect an occupant by using an airbag and that can reliably reduce an impact exerted on the occupant from behind a seat back during a collision without using a complex structure.

A first aspect of the present invention provides a vehicle seat including a seat back, and an airbag that deploys in the seat back. The airbag deploys in the seat back in such a way that, after having deployed, the airbag elastically supports an upper body of an occupant and elastically receives an impact force applied to a back surface of the seat back. After having deployed, the airbag has such a shape that a deployment amount, in a front-back direction, of the airbag near a side of the seat back is greater than that near a center of the seat back.

After having deployed, the airbag may have such a shape that a deployment amount, in the front-back direction, of the airbag near an outer side of a vehicle is greater than that near an inner side of the vehicle.

After having deployed, the airbag may have such a shape that a deployment amount, in the front-back direction, of the airbag near an inner side of a vehicle is greater than that near an outer side of the vehicle.

A second aspect of the present invention provides a vehicle seat including a seat back, and an airbag that deploys in the seat back. After having deployed, the airbag has such a shape that a deployment amount, in the front-back direction, of the airbag near an upper part of the seat back differs from that near a lower part of the seat back. The airbag deploys in the seat back in such a way that, after having deployed, the airbag elastically supports an upper body of an occupant and elastically receives an impact force applied to a back surface of the seat back.

After having deployed, the airbag may have such a shape that a deployment amount, in the front-back direction, of the airbag near an upper part of the seat back is greater than that near a lower part of the seat back.

After having deployed, the airbag may have such a shape that a deployment amount, in the front-back direction, of the airbag near a lower part of the seat back is greater than that near an upper part of the seat back.

After the airbag has deployed, the back surface of the airbag may have an undulating shape that allows the airbag to restrain and hold an impact applying member that applies an impact force to the back surface of the seat back.

An third aspect of the present invention provides a vehicle seat including a seat back, and an airbag that deploys in the seat back. The airbag deploys in the seat back in such a way that, after having deployed, the airbag elastically supports an upper body of an occupant and elastically receives an impact force applied to a back surface of the seat back. After having deployed, the airbag has such a shape that a deployment amount, in a front-back direction, of the airbag near a front side of the seat back is greater than that near a back side of the seat back.

A fourth aspect of the present invention provides a vehicle seat including a seat back, and an airbag that deploys in the seat back. The airbag deploys in the seat back in such a way that, after having deployed, the airbag elastically supports an upper body of an occupant and elastically receives an impact force applied to a back surface of the seat back. After having deployed, the airbag has such a shape that a deployment amount, in a front-back direction, of the airbag near a back side of the seat back is greater than that near a front side of the seat back.

A fifth aspect of the present invention provides a vehicle seat including a seat back, a seat back frame disposed in the seat back, an airbag that is disposed in the seat back and that deploys in the seat back, and a reaction-force-receiving member that is disposed in the seat back and that controls a deployment direction of the airbag by receiving a reaction force generated when the airbag deploys. The airbag deploys in the seat back in such a way that, after having deployed, the airbag elastically supports an upper body of an occupant and elastically receives an impact force applied to a back surface of the seat back.

The reaction-force-receiving member may be an elastic support member that is disposed across the seat back frame.

The airbag may be disposed between the elastic support member and the back surface of the seat back.

The airbag may be disposed between the elastic support member and a seat pad that is disposed in front of the elastic support member.

The airbag may be disposed between a lumbar support and the seat pad, the lumbar support being suspended in the seat back frame.

The reaction-force-receiving member may be a floating member that is floatingly supported in the seat back frame via a tensile member fixed to the seat back frame.

The floating member may be floatingly supported by a plurality of the tensile members that cross each other between frames of the seat back frame, the frames facing each other, and the airbag may be supported by the floating member at a position between the floating member and crossing portions of the plurality of tensile members.

A sixth aspect of the present invention provides a vehicle seat including a seat back, a seat back frame disposed in the seat back, and an airbag that is disposed in the seat back and that deploys in the seat back. An entirety of the seat back frame has a substantially frame-like shape extending along an outline of the seat back. The airbag is disposed in the seat back frame. An inflator is attached to a floating member that is flexibly supported at a plurality of positions within the seat back frame. The inflator causes the airbag to deploy in the seat back in such a way that, after having deployed, the airbag elastically supports an upper body of an occupant and elastically receives an impact force applied to a back surface of the seat back.

The floating body may be flexibly supported by a plurality of tension springs extending radially between the seat back frame and the floating member.

The floating member may be a flat member extending in a direction that is substantially parallel to a direction in which the seat back extends.

BRIEF DESCRIPTION OF THE DRAWINGS

FIG. 6A is a cross-sectional view of a seat back, and FIG. 6B illustrates how the seat back operates;

FIG. 8A is a longitudinal sectional view of a seat back according to a second example, and FIG. 8B illustrates how the seat back operates;

FIG. 10A is a longitudinal sectional view of a seat back, and FIG. 10B illustrates how the seat back operates;

FIG. 13A is a cross-sectional view of a seat back, and FIG. 13B illustrates how the seat back operates;

FIG. 21 is a cross-sectional view of a vehicle seat according to a modification of the sixth example of the present invention, taken along a line corresponding to line XIX-XIX of FIG. 18;

FIG. 22 is a cross-sectional view of the seat back according to the modification, illustrating how the vehicle seat operates when a collision occurs;

DETAILED DESCRIPTION

Hereinafter, vehicle seats according to examples of the present invention will be described with reference to the drawings.

First Example

Figure 1:
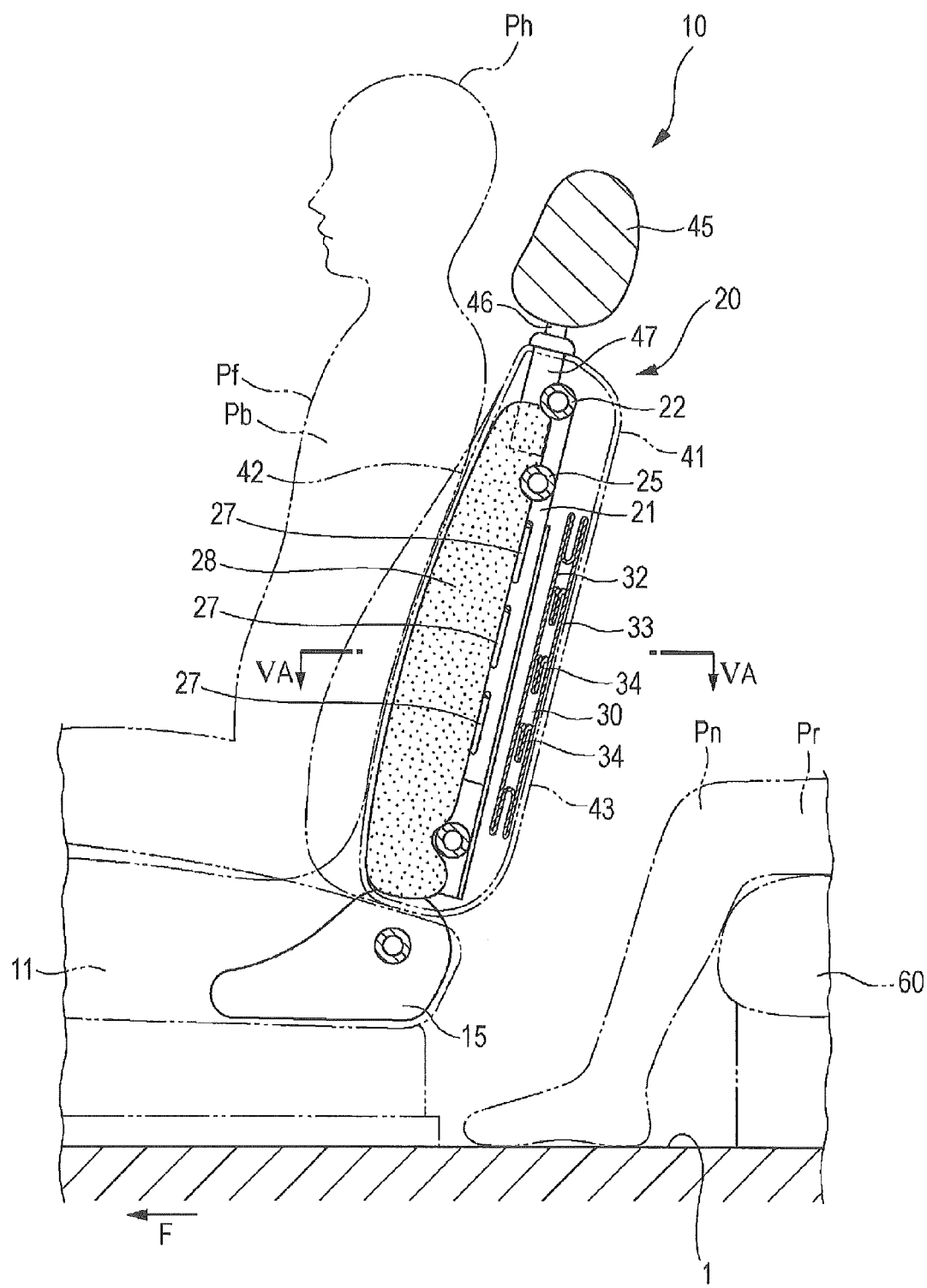
FIG. 1 is a longitudinal sectional view of a vehicle seat according to a first example.
Figure 2:
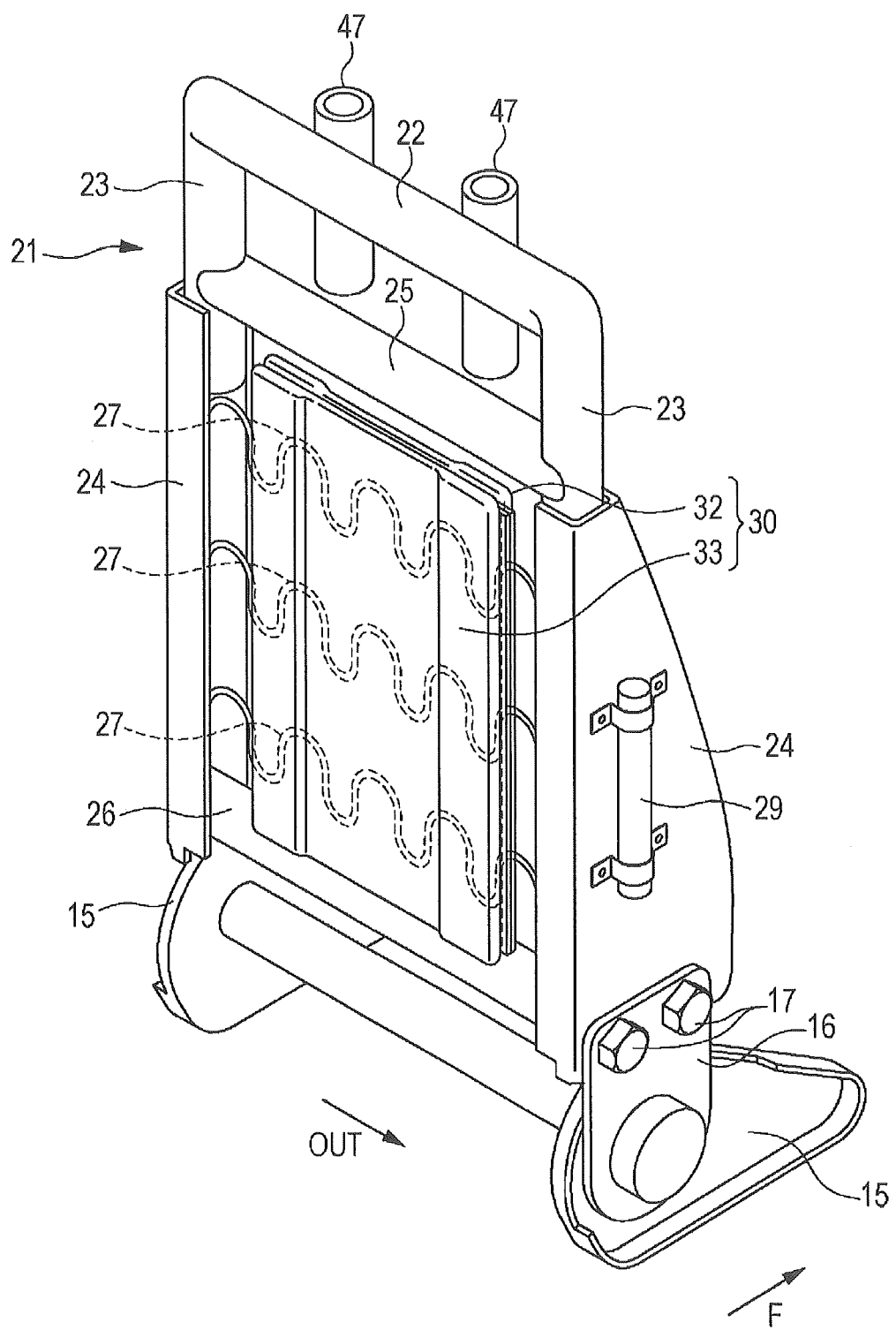
FIG. 2 is a partially cutaway rear perspective view of the vehicle seat.
Figure 3:
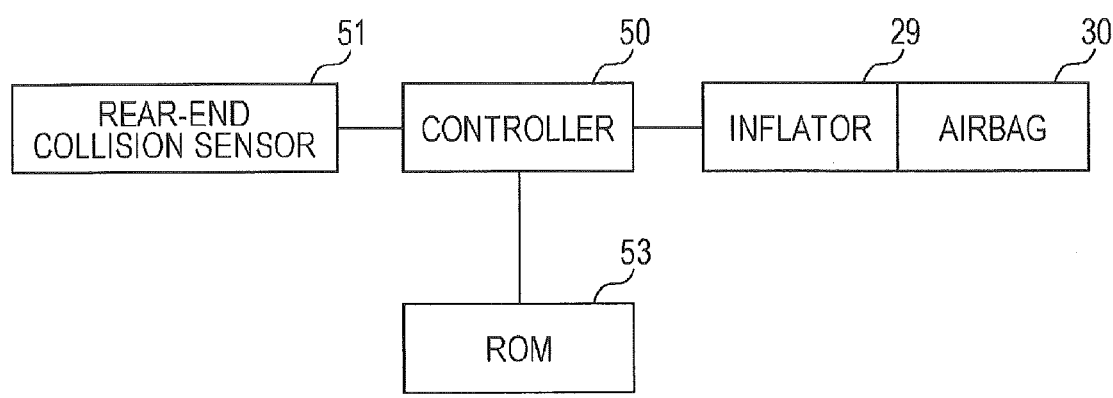
FIG. 3 is a block diagram of a control circuit of an airbag.
Figure 4:
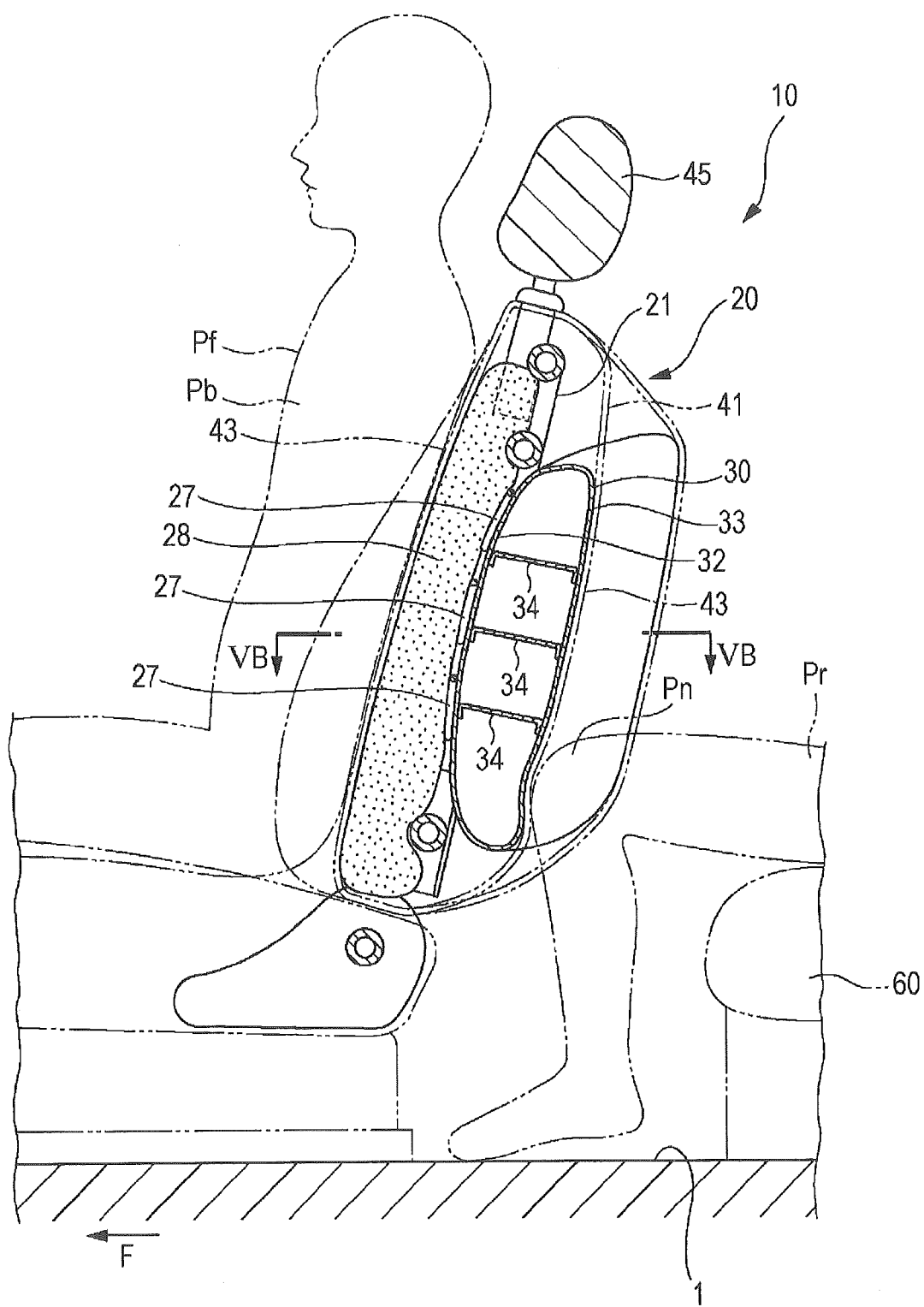
FIG. 4 illustrates how the vehicle seat operates when a collision occurs.
Figure 5A:
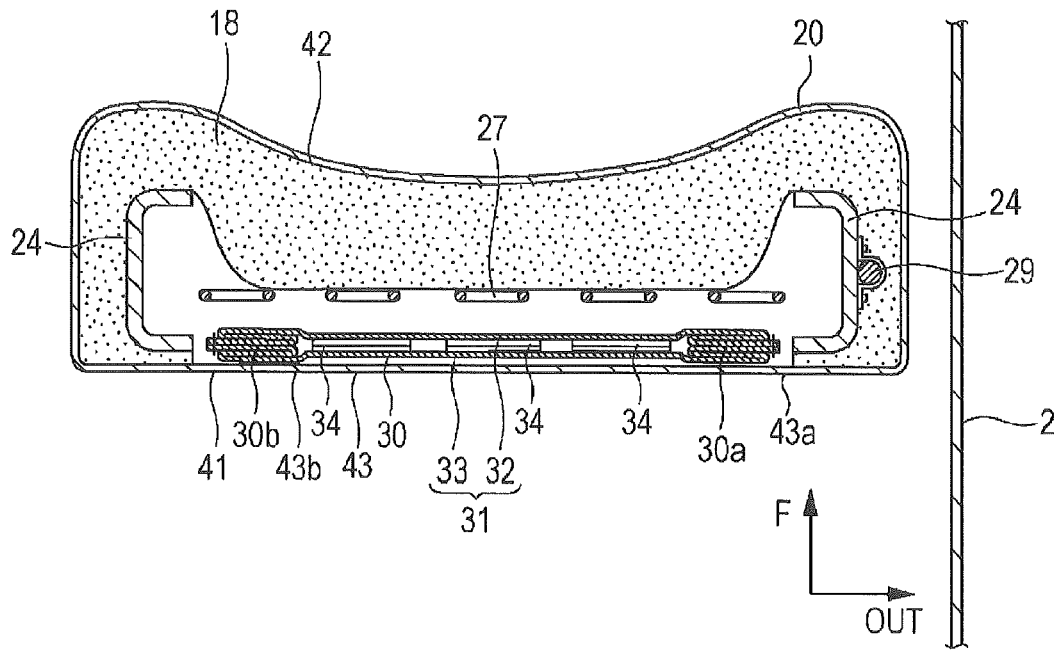
FIG. 5A is a cross-sectional view of the vehicle seat taken along line VA-VA of FIG. 1.
Figure 5B:
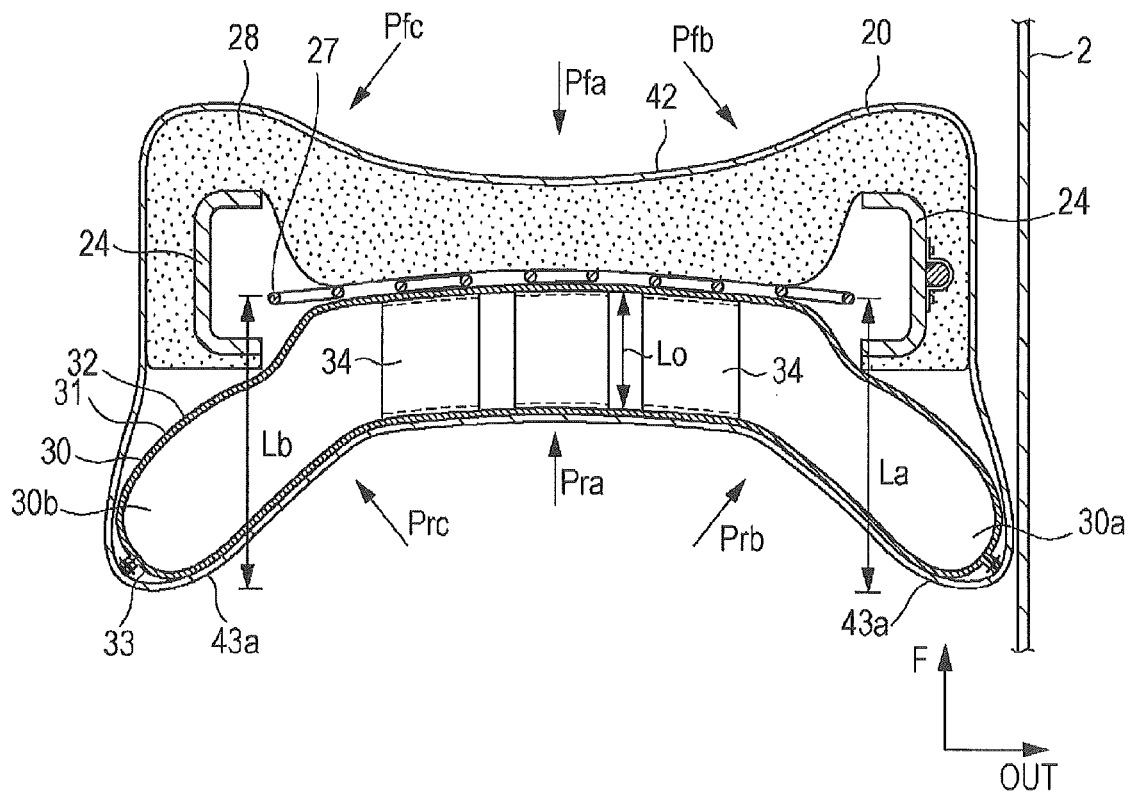
FIG. 5B is a cross-sectional view of the vehicle seat taken along line VB-VB of FIG. 4.

Referring to FIGS. 1 to 5B, a vehicle seat according to a first example of the present invention will be described. FIG. 1 is a longitudinal sectional view of the vehicle seat according to the first example. FIG. 2 is a partially cutaway rear perspective view of the vehicle seat. FIG. 3 is a block diagram of a control circuit of an airbag. FIG. 4 illustrates how the vehicle seat operates when a collision occurs. FIGS. 5A and 5B, which illustrate how the vehicle seat operates, are respectively a cross-sectional view of the vehicle seat taken along line VA-VA of FIG. 1 and a cross-sectional view of the vehicle seat taken along line VB-VB of FIG. 4. In each of the figures, an arrow F indicates the forward direction of the vehicle, and an arrow OUT indicates a direction outward in the vehicle-width direction.

As illustrated in FIG. 1, a front seat 10 and a rear seat 60, each corresponding to a vehicle seat, are disposed on a floor 1 in a vehicle. The front seat 10 includes a seat cushion 11, a seat back 20, and a head rest 45. The seat cushion 11 is supported on the floor 1 and supports the buttocks of an occupant Pf. The seat back 20 supports the upper body Pb, including the abdomen and the chest, of the occupant Pf from behind.

As illustrated in FIGS. 1 and 2, the front seat 10 further includes a seat back frame 21, a plurality of elastic support members 27, a seat pad 28, and an airbag 30. The seat back frame 21 forms the skeleton of the seat back 20. The elastic support members 27 extend across the seat back frame 21. The seat pad 28 is disposed on the front sides of the elastic support members 27. The airbag 30 is disposed behind the elastic support members 27 in a deflated state. The entirety of the seat back 20 is covered with a covering 41.

The seat back frame 21 includes an upper frame 22, a pair of side frames 23, a pair of left and right side brackets 24, an upper cross member 25, and a lower cross member 26. The upper frame 22, which extends in the vehicle-width direction, and the pair of side frames 23, which extend downward from both ends of the upper frame 22, form an angular-U-shaped or U-shaped pipe frame. The left and right side brackets 24 are respectively fixed to side ends of the side frames 23. The upper cross member 25, which is pipe-shaped, extends between upper end portions of the left and right side frames 23 in the vehicle-width direction. The lower cross member 26 extends between lower end portions of the left and right side brackets 24. The seat back frame 21, which is made of these components, has a substantially rectangular frame-like shape.

The elastic support members 27, which are S-shaped springs or the like each made of a metal wire, extend between the side frames 23 and between the side brackets 24. In the first example, the number of the elastic support members 27 is three. The seat pad 28, which is made of urethane foam or the like, is disposed on the front sides of the elastic support members 27. The airbag 30, which is folded in a flat rectangular shape in a deflated state, is disposed behind the elastic support members 27.

The covering 41 covers the entirety of the seat back 20, including the seat back frame 21, the seat pad 28, the airbag 30, and the like. The covering 41 is made of a stretchable cloth (fabric, knit, or nonwoven cloth) or a stretchable leather (natural leather or synthetic leather). The covering 41 has a bag-like shape and includes a front portion 42, which covers the front side of the seat pad 28, and a back portion 43, which covers the airbag 30. The airbag 30 is deployably supported by the covering 41 and the like through, for example, an engagement mechanism (not illustrated). The airbag 30 has a gas inlet (not illustrated), which is connected to an inflator 29 attached to one of the side brackets 24.

Bottom ends of the side brackets 24 of the seat back frame 21 of the seat back 20 are attached to rotary arms 16 of reclining mechanisms 15, which are disposed at rear ends of the seat cushion 11, by using bolts 17. Thus, the seat back frame 21 is integrally connected with the rotary arms 16 of the reclining mechanisms 15. Detailed description of the reclining mechanisms 15 will be omitted, because existing mechanisms can be used as the reclining mechanisms 15 and the structure of the reclining mechanisms 15 is not directly related to the present invention.

As illustrated in FIGS. 1 and 2, a pair of left and right stay brackets 47, each having a hollow cylindrical shape, are integrally formed with the upper frame 22 of the seat back frame 21. The head rest 45 is attached to an upper end of the seat back 20 by inserting stays 46 of the head rest 45 into the stay brackets 47.

As illustrated FIG. 1 and FIG. 5A, which is a cross-sectional view taken along line VA-VA of FIG. 1, the airbag 30, which is disposed between the elastic support member 27 and the back portion 43 of the covering 41, includes an airbag body 31 and a plurality of tethers 34. The airbag body 31 is formed by sewing the periphery of a front covering 32 and the periphery of a rear covering 33 together. The front covering 32 is substantially rectangular and is disposed near the elastic support members 27 so as to face the elastic support members 27. The rear covering 33 is disposed near the back portion 43 of the covering 41 so as to face the front covering 32. The tethers 34 extend between central parts, in the width direction, of the front covering 32 and the rear covering 33. The tethers 34, each having a strip-like shape or a tape-like shape, restrict the deployment amount of the airbag 30 in the front-back direction.

The airbag 30 operates as follows when an inflation gas is supplied to the airbag 30 from the inflator 29. The airbag 30 deploys between the elastic support members 27 and the back portion 43 of the covering 41. As illustrated in FIG. 4 and FIG. 5B, which is a cross-sectional view taken along line VB-VB of FIG. 4, the tethers 34 restrict a deployment amount Lo in the front-back direction at the central part of the airbag 30 in the width direction. An outer side portion 30a of the airbag 30, which is located near a side portion of the seat back 20 facing a side wall 2 of the vehicle, protrudes backward and in the vertical direction. Thus, the outer side portion 30a deploys by a large deployment amount La so as to provide a sufficient impact absorbing distance. An inner side portion 30b of the airbag 30, which is located near an inner side of the seat back 20, that is, near the center of the vehicle in the width direction, protrudes backward and in the vertical direction. Thus, the inner side portion 30b deploys by a large deployment amount Lb in the front-back direction. As the outer side portion 30a and the inner side portion 30b of the airbag 30 deploy, an outer region 43a and an inner region 43b of the back portion 43 of the covering 41 protrude considerably.

In other words, after having deployed, the airbag 30 has such a shape that the deployment amounts, in the front-back direction, of the outer side portion 30a and the inner side portion 30b, which are located near sides of the seat back 20, are greater than that of a portion of the airbag 30 near the center of the seat back 20. The airbag 30 has an orifice (not illustrated), through which the inflation gas is discharged to the outside from the inside of the airbag 30.

The airbag 30 deploys while being held by the elastic support members 27 and covered by the back portion 43 of the covering 41, which stretches and protrudes. Therefore, the deployment of the airbag 30 is controlled so that the airbag 30 can stably deploy with a sufficient deployment amount, and the airbag has a sufficient impact absorbing distance in the front-back direction of the vehicle.

FIG. 3 illustrates a control circuit of a vehicle airbag. The control circuit includes a controller 50 that controls the deployment of the airbag 30. The controller 50 controls the operation of the inflator 29 in accordance with information from a rear-end collision sensor 51, which predicts a rear-end collision of the vehicle and an impact load of the collision, and a program stored in a ROM 53.

The controller 50 includes a timer that measures the amount of time elapsed from the time at which a rear-end collision is predicted to occur. The rear-end collision sensor 51 includes a distance sensor, such as a millimeter wave sensor. The rear-end collision sensor 51 predicts a rear-end collision by measuring the distance between the vehicle and another vehicle that might cause a collision and the relative speed of the other vehicle. Moreover, the rear-end collision sensor 51 predicts an impact load that will be applied to the vehicle if the predicted rear-end collision occurs.

When the rear-end collision sensor 51 of a vehicle, which has the vehicle seat described above, predicts a rear-end collision that will generate a predetermined impact load or more, the controller 50 outputs a signal to the inflator 29 and the inflator 29 discharges the inflation gas. Thus, the airbag 30 deploys from a deflated state, which is illustrated in FIGS. 1 and 5A, in a space between the elastic support member 27 and the back portion 43 of the covering 41 as illustrated in FIGS. 4 and 5B. Due to the deployment, the airbag 30 elastically receives backward movement of the upper body Pb of an occupant in the front seat Pf (as schematically indicated by an arrow Pf in FIG. 5B), which is caused by the rear-end collision, through the front portion 42 of the covering 41, the seat pad 28, and the elastic support members 27; and therefore the airbag 30 restrains the backward movement.

An occupant Pr in the rear seat may move linearly forward (as schematically indicated by an arrow Pra) due to deformation of the vehicle body caused by an impact of a rear-end collision or due to a rebound after moving backward and pressing a seat back during a rear end collision. As a result, for example, a knee Pn of the occupant Pr may contact the back surface of the seat back 20 of the front seat 10. At this time, the airbag 30, which has deployed between the elastic support members 27 of the seat back 20 and the back portion 43 of the covering 41, elastically receives the knee Pn through the covering 41, and restrains the forward movement of the knee Pn. Thus, the upper body Pb of the occupant Pf in the front seat 10 is prevented from receiving an impact force from the knee Pn of the occupant Pr in the rear seat 60. As a result, the occupant Pf is protected. Likewise, the deployed airbag 30 elastically receives an impact force applied to the knee Pn of the occupant Pr in the rear seat 60, who moves forward, due to contact of the knee Pn with the back surface of the seat back 20 and an impact force applied to the upper body, including the chest, of the occupant Pr. As a result, the occupant Pr is protected.

In particular, if the vehicle is involved in an offset rear-end collision or the like and the vehicle yaws, it may happen that the occupant Pf in the front seat 10 is moved diagonally backward toward the side wall 2, which is outward of the vehicle (as schematically indicated by an arrow Pfb) and the occupant Pr in the rear seat is moved diagonally forward toward the side wall 2 (as schematically indicated by an arrow Prb). In such a situation, the deployed airbag 30, in particular, the outer side portion 30a, which deploys by the large deployment amount La, elastically receives the diagonal backward movement of the upper body Pb of the occupant Pf in the front seat 10 through the front portion 42 of the covering 41, the seat pad 28, and the elastic support members 27; and restrains the diagonal backward movement.

The outer side portion 30a of the airbag 30, which has deployed so as to protrude backward in a space between the elastic support members 27 of the seat back 20 and the outer region 43a of the back portion 43 of the covering 41, elastically receives the knee Pn of the occupant Pr in the rear seat 60 so as to restrain the knee Pn from moving forward and toward the side wall 2. Thus, the upper body Pb of the occupant Pf in the front seat 10 is protected from receiving an impact force from the knee Pn of the occupant Pr in the rear seat 60. Likewise, the outer side portion 30a of the airbag 30, which deploys by a sufficient deployment amount so as to provide a sufficient impact absorbing distance, elastically receives an impact force applied to the knee Pn of the occupant Pr in the rear seat 60 and an impact force applied to the upper body of the occupant Pr, including the chest, and the occupant Pr is prevented from contacting the side wall 2 of the vehicle.

If the vehicle is involved in an offset rear-end collision or the like and the vehicle yaws, it may happen that the occupant Pf in the front seat 10 is moved diagonally backward toward the center in the vehicle width direction, which is inward of the vehicle (as schematically indicated by an arrow Pfc) and the occupant Pr in the rear seat is moved diagonally forward toward the inside of the vehicle (as schematically indicated by an arrow Prc). In such a situation, the airbag 30, in particular, the inner side portion 30b, which deploys by the large deployment amount Lb, elastically receives the diagonal backward movement of the upper body Pb of the occupant Pf in the front seat 10 through the front portion 42 of the covering 41, the seat pad 28, and the elastic support members 27; and restrains the diagonal backward movement.

The inner side portion 30b of the airbag 30, which has deployed so as to protrude backward in a space between the elastic support members 27 of the seat back 20 and the inner region 43b of the back portion 43 of the covering 41, elastically receives the knee Pn of the occupant Pr in the rear seat 60 so as to restrain the knee Pn from moving forward toward the center of the vehicle. Thus, the upper body Pb of the occupant Pf in the front seat 10 is protected from receiving an impact force from the knee Pn of the occupant Pr in the rear seat 60. Likewise, the inner side portion 30b of the airbag 30 elastically receives an impact force applied to the knee Pn of the occupant Pr in the rear seat 60 and an impact force applied to the upper body, including the chest, of the occupant Pr. As a result, the occupant Pr is protected.

With the structure described above, each of the outer side portion 30a and the inner side portion 30b of the airbag 30 deploys by a large amount in the front-back direction. Accordingly, without using a complex structure, the airbag 30 can directly protect the occupant Pf and can reduce an impact applied to the occupant Pf from behind the seat back 20 during a collision.

In the example described above, the deployment amounts La and Lb of the outer side portion 30a and the inner side portion 30b in the front-back direction are each greater than the deployment amount Lo of a central portion of the airbag 30. Alternatively, only the deployment amount La of the outer side portion 30a may be greater than the deployment amount Lo of the central portion of the airbag 30.

Referring to FIGS. 6A and 6B, this example will be described. FIG. 6A is a cross-sectional view of a seat back, and FIG. 6B illustrates how the seat back operates. Elements in FIGS. 6A and 6B corresponding to those in FIGS. 5A and 5B will be denoted by the same numerals, and detailed descriptions of such elements will be omitted.

As illustrated in FIG. 6A, the airbag 30, which is disposed between the elastic support members 27 and the back portion 43 of the covering 41, includes an airbag body 31 and a plurality of tethers 34. The airbag body 31 is formed by sewing the periphery of a front covering 32 and the periphery of a rear covering 33 together. The tethers 34 extend between inner parts and central parts, in the width direction, of the front covering 32 and the rear covering 33.

The airbag 30 operates as follows when an inflation gas is supplied to the airbag 30 from the inflator 29. As illustrated in FIG. 6B, the tethers 34 restrict the deployment amount Lo in the front-back direction. The outer side portion 30a of the airbag 30, which is located near a side portion of the seat back 20 facing the side wall 2 of the vehicle, protrudes backward and in the vertical direction. Thus, the outer side portion 30a deploys by a large deployment amount La in the front-back direction. In other words, after having deployed, the airbag 30 has such a shape that the deployment amount, in the front-back direction, of the outer side portion 30a, which is located near a side of the seat back 20, is greater than that of a portion of the airbag 30 near the center of the seat back 20.

When a vehicle including the vehicle seat described above predicts a rear-end collision, the airbag 30 deploys between the elastic support members 27 and the back portion 43 of the covering 41 as illustrated in FIG. 6B. Due to the deployment, the airbag 30 elastically receives an restrains backward movement of the upper body Pb of an occupant Pf in the front seat 10, which is caused by the rear-end collision.

The deployed airbag 30 elastically receives the knee Pn of the occupant Pr in the rear seat 60, and restrains forward movement of the knee Pn. Therefore, the occupant Pf in the front seat 10 is prevented from receiving an impact force from the knee Pn. As a result, the occupant Pf is protected. Likewise, the deployed airbag 30 elastically receives impact forces applied to the knee Pn and the upper body, such as the chest, of the occupant Pr in the rear seat 60, who moves forward. As a result, the occupant Pr is protected.

If the vehicle is involved in an offset rear-end collision or the like and the vehicle yaws, it may happen that the occupant Pf in the front seat 10 is moved diagonally backward toward the side wall 2 of the vehicle, which is outward from the vehicle, and the occupant Pr in the rear seat is moved diagonally forward toward the side wall 2 of the vehicle. In such a situation, the airbag 30, in particular, the outer side portion 30a, which deploys by a large deployment amount, elastically receives the diagonal backward movement of the upper body Pb of the occupant Pf in the front seat 10 through the seat pad 28 and the elastic support members 27. As a result, the backward movement of the occupant Pf is restrained.

Moreover, the outer side portion 30a of the airbag 30, which has deployed so as to protrude backward, elastically receives the knee Pn of the occupant Pr in the rear seat 60 and restrains movement of the knee Pn diagonally forward toward the side wall 2 of the vehicle. As a result, the occupant Pf in the front seat 10 is protected. Likewise, the outer side portion 30a of the deployed airbag 30 elastically receives the knee Pn, the chest, and the like of the occupant Pr in the rear seat 60, who moves forward, and prevents the knee Pr and the like from contacting the side wall 2 of the vehicle. As a result, the occupant Pr is protected.

Figure 7A:
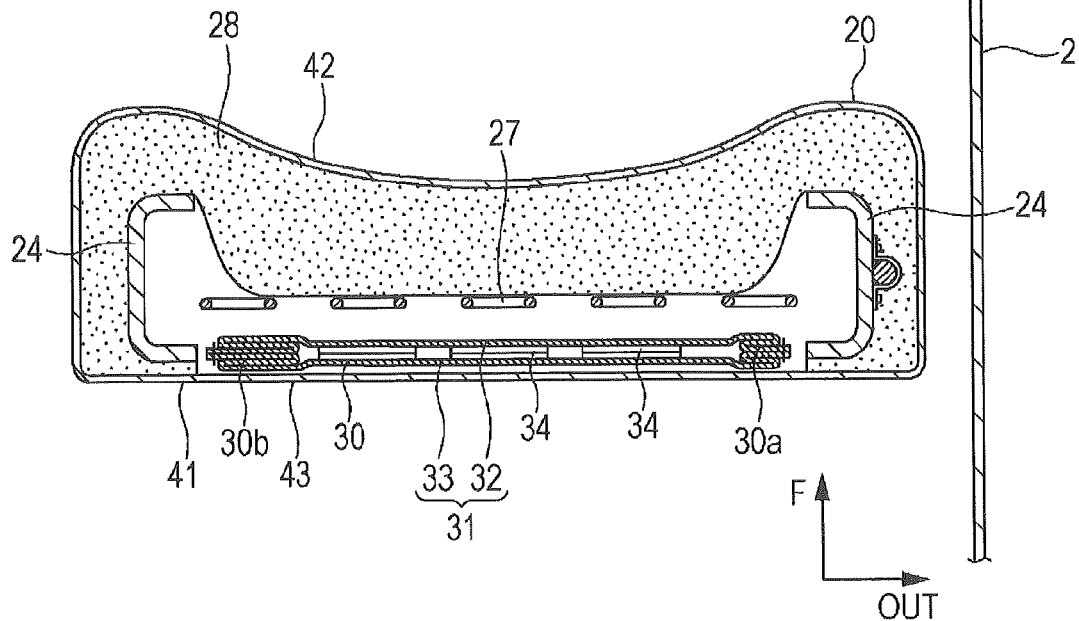
FIG. 7A is a cross-sectional view of a seat back.
Figure 7B:
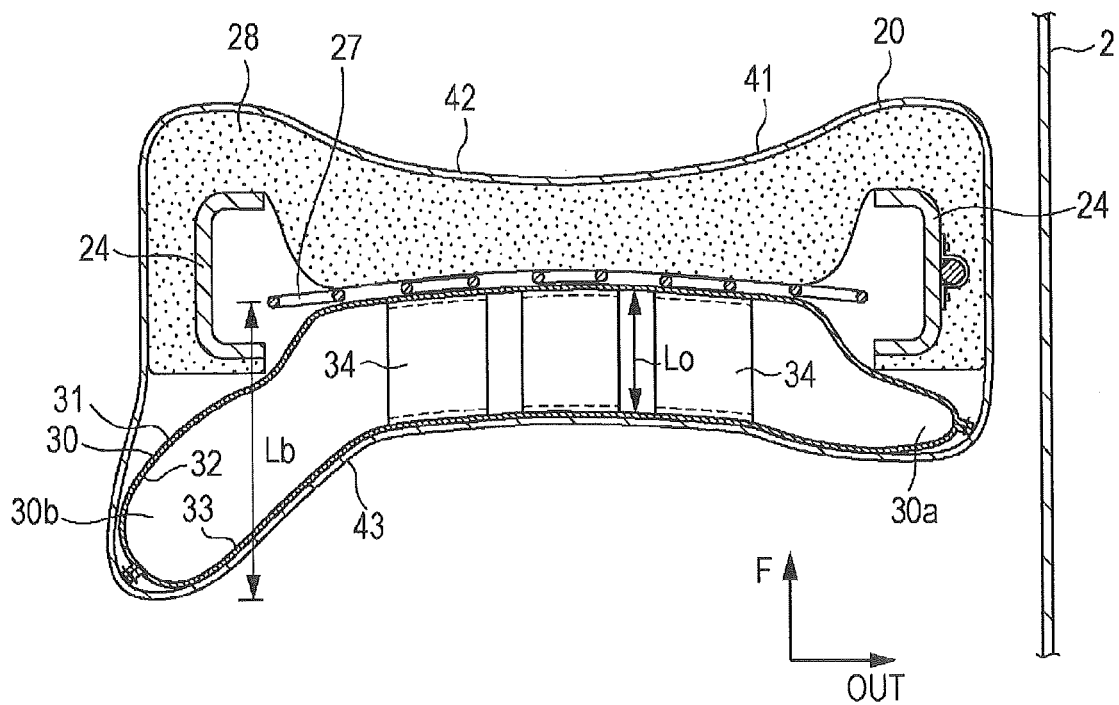
FIG. 7B illustrates how the seat back operates.

Further alternatively, only the deployment amount Lb of the inner side portion 30b may be greater than the deployment amount Lo of the central portion of the airbag 30. Referring to FIGS. 7A and 7B, this example will be described. FIG. 7A is a cross-sectional view of a seat back, and FIG. 7B illustrates how the seat back operates. Elements in FIGS. 7A and 7B corresponding to those in FIGS. 6A and 6B will be denoted by the same numerals, and detailed descriptions of such elements will be omitted.

As illustrated in FIG. 7A, the airbag 30, which is disposed between the elastic support members 27 and the back portion 43 of the covering 41, includes an airbag body 31 and a plurality of tethers 34. The airbag body 31 is formed by sewing the periphery of a front covering 32 and the periphery of a rear covering 33 together. The tethers 34 extend between outer parts and central parts, in the width direction, of the front covering 32 and the rear covering 33.

The airbag 30 operates as follows when an inflation gas is supplied to the airbag 30 from the inflator 29. As illustrated in FIG. 7B, the tethers 34 restrict the deployment amount Lo in the front-back direction. The inner side portion 30b of the airbag 30, which is located near an inner side of the seat back 20, protrudes backward and in the vertical direction, and the inner side portion 30b deploys by a large deployment amount Lb in the front-back direction. In other words, after having deployed, the airbag 30 has such a shape that the deployment amount, in the front-back direction, of the inner side portion 30b, which is located near an inner side of the seat back 20, is greater than that of a portion of the airbag 30 near the center of the seat back 20.

When a vehicle including the vehicle seat described above predicts a rear-end collision, the airbag 30 deploys between the elastic support members 27 and the back portion 43 of the covering 41 as illustrated in FIG. 7B. The deployed airbag 30 elastically receives and restrains backward movement of the upper body Pb of an occupant Pf in the front seat 10, which is caused by the rear-end collision.

The deployed airbag 30 elastically receives the knee Pn of the occupant Pr in the rear seat 60, and restrains forward movement of the knee Pn. Therefore, the occupant Pf in the front seat 10 is prevented from receiving an impact force from the knee Pn. As a result, the occupant Pf is protected. Likewise, the deployed airbag 30 elastically receives impact forces applied to the knee Pn and the upper body, such as the chest, of the occupant Pr in the rear seat 60, who moves forward. As a result, the occupant Pr is protected.

If the vehicle is involved in an offset rear-end collision or the like and the vehicle yaws, it may happen that the occupant Pf in the front seat 10 is moved diagonally backward toward the center of the vehicle, and the occupant Pr in the rear seat is moved diagonally forward toward the center of the vehicle. In such a situation, the airbag 30, in particular, the inner side portion 30b that deploys by a large deployment amount, elastically receives the diagonal backward movement of the upper body Pb of the occupant Pf in the front seat 10 through the seat pad 28 and the elastic support members 27; and restrains the backward movement.

The inner side portion 30b of the airbag 30, which has deployed so as to protrude backward, elastically receives the knee Pn of the occupant Pr in the rear seat 60 and restrains movement of the knee Pn. As a result, the occupant Pf in the front seat 10 is prevented from receiving an impact force from the knee Pn, and the occupant Pf is protected. Likewise, the inner side portion 30b of the deployed airbag 30 elastically receives the knee Pn and the upper body, such as the chest, of the occupant Pr in the rear seat 60, who moves forwards. As a result, the occupant Pr is protected.

By forming the airbag 30 in such a way that one of the outer side portion 30a and the inner side portion 30b deploys backward by a large amount, the size and the deployment amount of the airbag 30 can be reduced and the output power of the inflator 29 can be reduced, as compared with the case where both the outer side portion 30a and the inner side portion 30b of the airbag 30 are deployed by large amounts.

Second Example

Figure 9A:
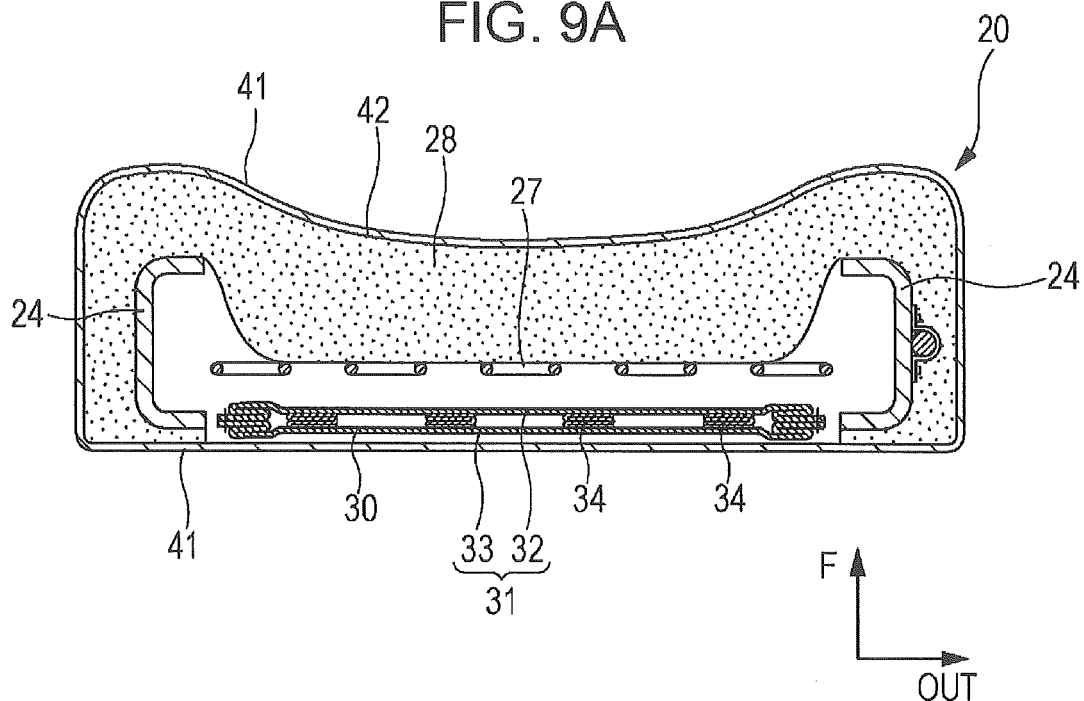
FIG. 9A is a cross-sectional view of the seat back taken along line IXA-IXA of FIG. 8A.
Figure 9B:
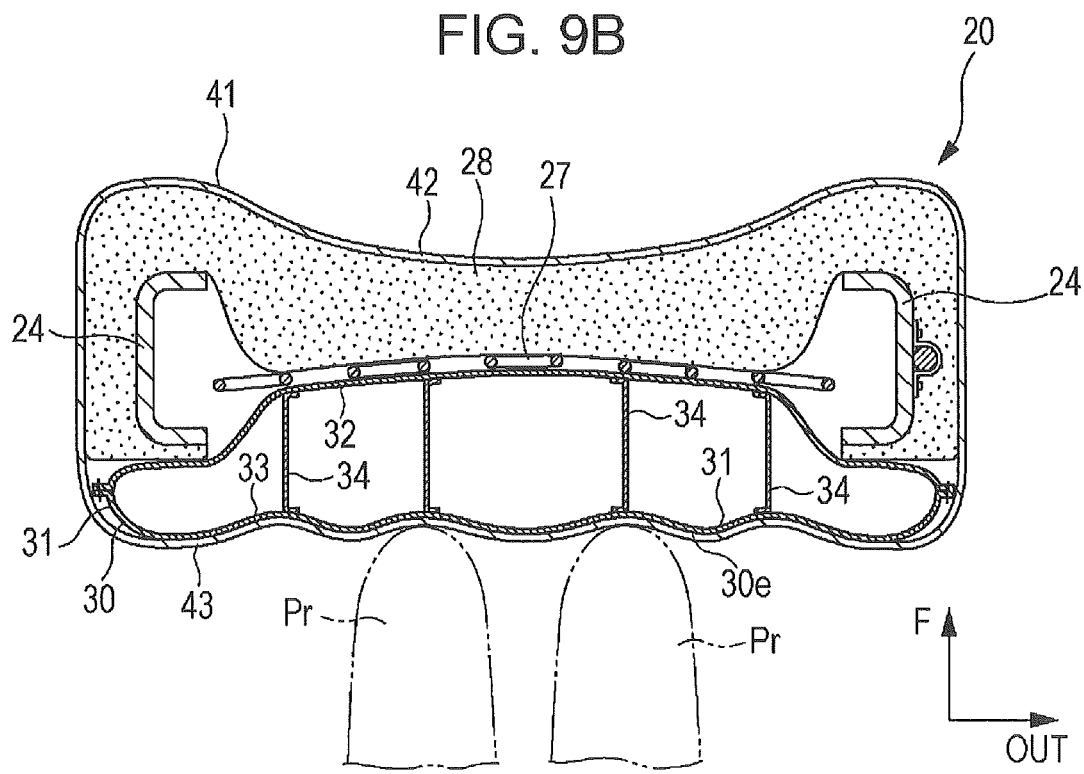
FIG. 9B is a cross-sectional view of FIG. 8B taken along line IXB-IXB.

Referring to FIGS. 8A to 9B, a vehicle seat according to a second example of the present invention will be described. FIG. 8A is a longitudinal sectional view of a seat back according to a second example, and FIG. 8B illustrates how the seat back operates. FIG. 9A is a cross-sectional view of the seat back taken along line IXA-IXA of FIG. 8A, and FIG. 9B is a cross-sectional view of FIG. 8B taken along line IXB-IXB. Elements in FIGS. 8A to 9B corresponding to those in FIGS. 1 to 7B will be denoted by the same numerals, and detailed descriptions of such elements will be omitted.

As in the first example, a seat back 20 of a front seat 10 includes a seat back frame 21, a plurality of elastic support members 27, a seat pad 28, and an airbag 30. The elastic support members 27 extend across the seat back frame 21. The seat pad 28 is disposed on the front sides of the elastic support members 27. The airbag 30 is disposed behind the elastic support members 27 in a deflated state. The entirety of the seat back 20 is covered with a covering 41, which is stretchable and has a bag-like shape.

As illustrated in FIGS. 8A and 8B, the airbag 30 includes an airbag body 31 and a plurality of tethers 34. The airbag body 31 is formed by sewing the periphery of a front covering 32 and the periphery of a rear covering 33 together. The front covering 32 is substantially rectangular and is disposed near the elastic support members 27. The rear covering 33 is disposed near a back portion 43 of the covering 41. As illustrated in FIGS. 9A and 9B, the tethers 34 are disposed with equal distances therebetween in the width direction of the seat so as to extend between lower parts of the front covering 32 and the rear covering 33. The tethers 34, each having a strip-like shape or a tape-like shape, restrict the deployment amount of the airbag 30 in the front-back direction.

The airbag 30 operates as follows when an inflation gas is supplied to the airbag 30 from the inflator 29. The airbag 30 deploys between the elastic support members 27 and the back portion 43 of the covering 41. As illustrated in FIGS. 8B and 9B, the tethers 34 restrict a deployment amount Ld of a lower portion 30d, which corresponds to a lower region of the seat back and to the height of the knee Pn of the occupant Pr in the rear seat 60. An upper portion 30h, which corresponds to an upper region of the seat back 20 and to the height of the chest of the occupant Pr in the rear seat 60, deploys so as to protrude backward by a large amount. Thus, the upper portion 30h deploys by a large deployment amount Lh in the front-back direction. As the upper portion 30h of the airbag 30 deploys, the upper region of the back portion 43 of the covering 41 protrudes by a large amount or may become torn. In other words, after having deployed, the airbag 30 has such a shape that the deployment amount of the airbag 30, in the front-back direction, near an upper part of the seat back 20 is greater than that near a lower part of the seat back 20.

As illustrated in FIG. 9B, each of the tethers 34 locally restricts the deployment amount of the lower portion 30d of the airbag 30, so that an undulating surface 30e is formed on the rear covering 33. The undulating surface 30e on the back side of the airbag 30 restricts movement of the knee Pn of the occupant Pr in the rear seat 60, which serves as an impact applying member that applies an impact force to the back side of the seat back 20.

The airbag 30 deploys while being held by the elastic support members 27 and covered by the back portion 43 of the covering 41, which stretches and protrudes. Therefore, the deployment of the airbag 30 is controlled so that the airbag 30 can stably deploy with a sufficient deployment amount, and the airbag 30 has a sufficient impact absorbing distance in the front-back direction of the vehicle.

When a vehicle including the vehicle seat described above predicts a rear-end collision, the airbag 30 deploys between the elastic support members 27 and the back portion 43 of the covering 41 as illustrated in FIG. 8B. The deployed airbag 30 elastically receives and restrains backward movement of the upper body Pb of an occupant Pf in the front seat 10, which is caused by the rear-end collision, through the front portion 42 of the covering 41, the seat pad 28, and the elastic support members 27.

The occupant Pr in the rear seat 60 is moved forward due to the impact of the rear-end collision. At this time, the knee Pn is fitted onto and elastically received by the undulating surface 30e of the lower portion 30d of the deployed airbag 30, so that forward movement of the knee Pn is restrained. Therefore, the upper body Pb of the occupant Pf in the front seat 10 is prevented from receiving an impact force from the knee Pn of the occupant Pr in the rear seat 60. As a result, the occupant Pf is protected.

Likewise, the knee Pn of the occupant Pr, who moves forward, is elastically received and protected by the lower portion 30d of the deployed airbag 30. At this time, the knee Pn is fitted onto the undulating surface 30e of the lower portion 30d of the airbag 30 as illustrated by an imaginary line in FIG. 8B. Therefore, relative movement between the lower portion 30d of the airbag 30 and the knee Pn is restrained, and the knee Pn is elastically received by the airbag 30.

The upper portion 30h of the airbag 30, which has considerably deployed and protruded as indicated by an imaginary line in FIG. 8B, elastically receives and protects the upper body, such as the chest, of the occupant Pr in the rear seat 60, who moves forward.

In the example described above, the deployment amount, in the front-back direction, of the upper portion 30h of the airbag 30, which is near an upper part of the seat back 20, is greater than that of the lower portion 30d, which is near a lower part of the seat back 20. Alternatively, the deployment amount of the lower portion 30d in the front-back direction may be greater than that of the upper portion 30f.

Referring to FIGS. 10A and 10B, this example will be described. FIG. 10A is a cross-sectional view of a seat back, and FIG. 10B illustrates how the seat back operates. Elements in FIGS. 10A and 10B corresponding to those in FIGS. 8A and 8B will be denoted by the same numerals, and detailed descriptions of such elements will be omitted.

A seat back 20 of a front seat 10 includes a seat back frame 21, a plurality of elastic support members 27, a seat pad 28, and an airbag 30. The elastic support members 27 extend across the seat back frame 21. The seat pad 28 is disposed on the front sides of the elastic support members 27. The airbag 30 is disposed behind the elastic support members 27. The entirety of the seat back 20 is covered with a covering 41, which is stretchable and has a bag-like shape.

As illustrated in FIGS. 10A and 10B, the airbag 30, which is disposed between the elastic support members 27 and a back portion 43 of the covering 41, includes an airbag body 31 and a plurality of tethers 34. The airbag body 31 is formed by sewing the periphery of a front covering 32 and the periphery of a rear covering 33 together. The tethers 34, for restricting the deployment amount in the front-back direction, extend between upper parts of the front covering 32 and the rear covering 33 in the width direction.

The airbag 30 operates as follows when an inflation gas is supplied to the airbag 30 from the inflator 29. The airbag 30 deploys between the elastic support members 27 and the back portion 43 of the covering 41. As illustrated in FIG. 10B, the tethers 34 restrict the deployment amount Lh of an upper portion 30h, which is near an upper region of the seat back 20. A lower portion 30d, which is located near a lower region of the seat back 20 and corresponds to the height of the knee Pn of the occupant Pr in the rear seat 60, deploys so as to protrude backward, and the lower portion 30d deploys by a large deployment amount Ld in the front-back direction.

When a vehicle including the vehicle seat described above predicts a rear-end collision, the airbag 30 deploys between the elastic support members 27 and the back portion 43 of the covering 41 as illustrated in FIG. 10B. The deployed airbag 30 elastically receives and restrains backward movement of the upper body Pb of an occupant Pf in the front seat 10, which is caused by the rear-end collision, through the front portion 42 of the covering 41, the seat pad 28, and the elastic support members 27.

The knee Pn of the occupant Pr in the rear seat 60 is elastically received and restrained by the lower portion 30d of the deployed airbag 30, which has deployed by a large amount, so that forward movement of the knee Pn is restrained. Therefore, the upper body Pb of the occupant Pf in the front seat 10 is protected from receiving an impact force from the knee Pn. As a result, the occupant Pf in the front seat is protected. The lower portion 30d of the deployed airbag 30 elastically receives and protects the knee Pn of the occupant Pr in the rear seat 60, who moves forward.

With the structures described above, the deployment amount of the lower portion 30d of the airbag 30 in the front-back direction is greater than that of the upper portion 30h, or the deployment amount of the upper portion 30h is greater than that of the lower portion 30d. Accordingly, without using a complex structure, the airbag 30 can directly protect the occupant Pf and can reduce an impact applied to the occupant Pf from behind the seat back 20 during a collision. Also in this case, an undulating surface that restrains and supports the knee Pn of the occupant Pf in the rear seat 60 may be formed on the back side of the airbag 30 as in the case described above.

Third Example

Figure 11:
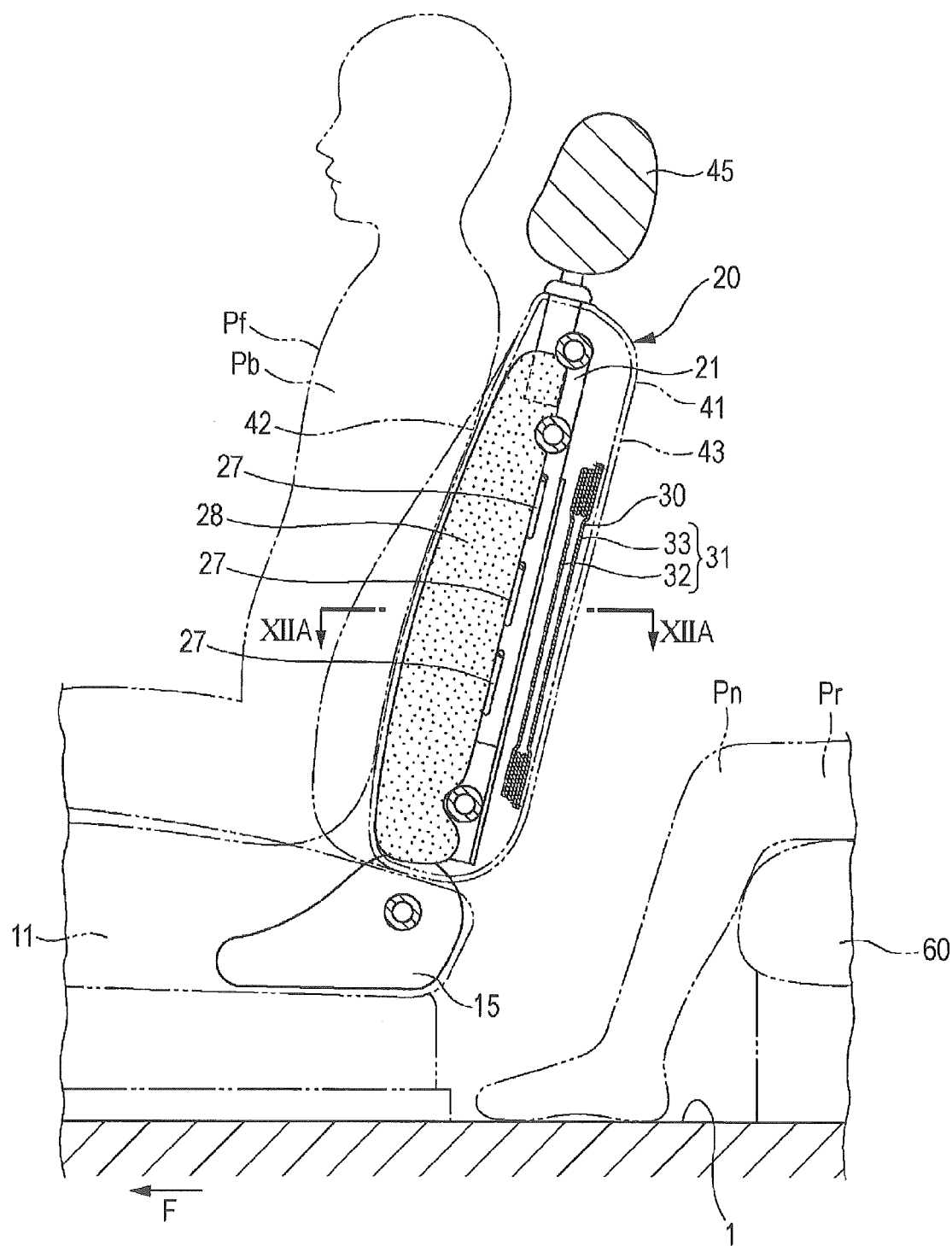
FIG. 11 is a longitudinal sectional view of a vehicle seat according to a third example.
Figure 12A:
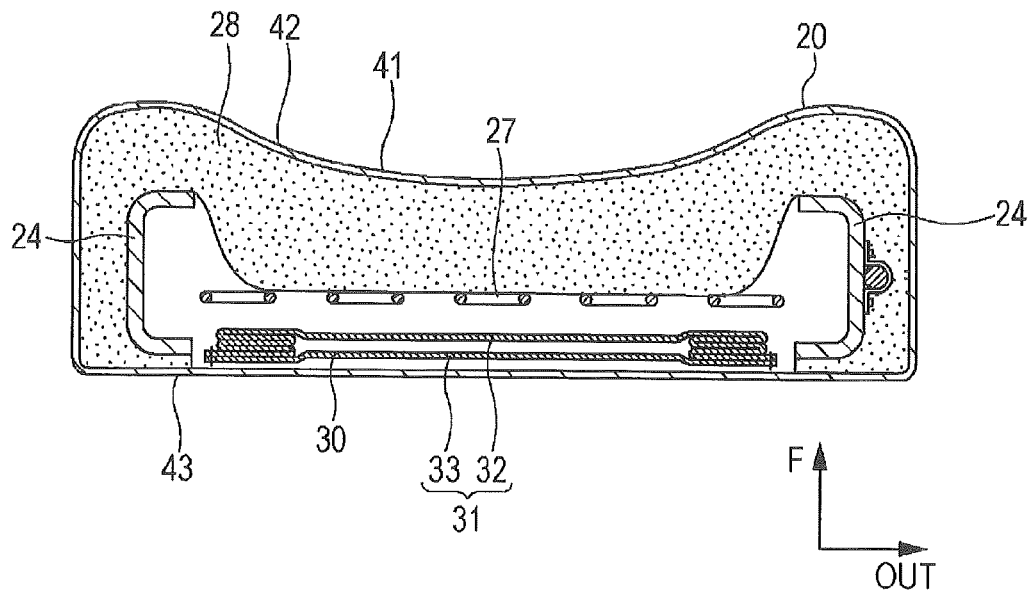
FIG. 12A is a cross-sectional view of the vehicle seat taken along line XIIA-XIIA of FIG. 11.
Figure 12B:
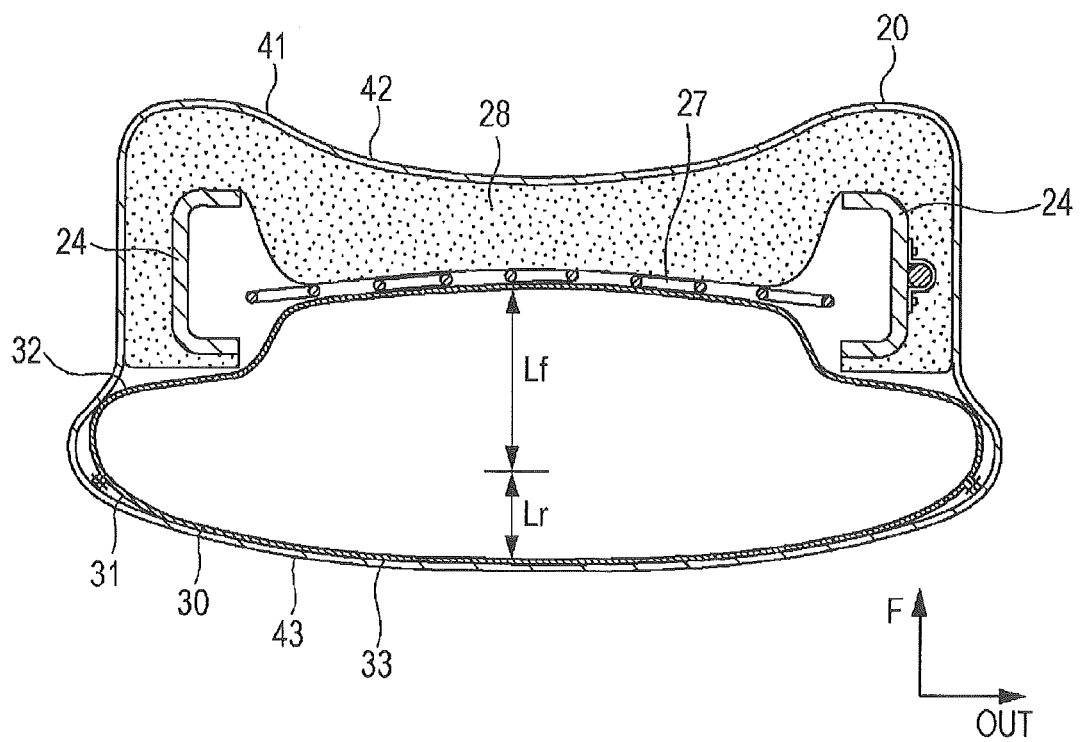
FIG. 12B illustrates how the vehicle seat operates.

Referring to FIGS. 11 to 12B, a vehicle seat according to a third example of the present invention will be described. FIG. 11 is a longitudinal sectional view of the vehicle seat. FIG. 12A is a cross-sectional view of the vehicle seat taken along line XIIA-XIIA of FIG. 11, and FIG. 12B illustrates how the vehicle seat operates. Elements in FIGS. 11 to 12B corresponding to those in FIGS. 1 to 7B will be denoted by the same numerals, and detailed descriptions of such elements will be omitted.

A seat back 20 of a front seat 10 includes a seat back frame 21, a plurality of elastic support members 27, a seat pad 28, and an airbag 30. The elastic support members 27 extend across the seat back frame 21. The seat pad 28 is disposed on the front sides of the elastic support members 27. The airbag 30 is disposed behind the elastic support members 27 in a deflated state. The entirety of the seat back 20 is covered with a covering 41, which is stretchable and has a bag-like shape.

As illustrated in FIGS. 12A and 12B, the airbag 30, which is disposed between the elastic support members 27 and the back portion 43 of the covering 41, includes an airbag body 31. The airbag body 31 is formed by sewing the periphery of a front covering 32 and the periphery of a rear covering 33 together. The front covering 32 is disposed near the elastic support members 27 so as face the elastic support members 27. The rear covering 33 is substantially rectangular and is disposed near the back portion 43 of the covering 41.

FIG. 12B illustrates the airbag 30 in a deployed state. The airbag 30 deploys in such a way that the front covering 32 of the airbag body 31 deploys by a deployment amount Lf in the front-back direction, which is comparatively large, and the rear covering 33 deploys by a deployment amount Lr in the front-back direction, which is considerably smaller than the deployment amount Lf of the front covering 32. In other words, the deployment amount of the airbag 30, in the front-back direction, near the elastic support members 27, which is near the front side of the seat back 20, is greater than that near the back portion 43, which is near the back side of the seat back 20.

When the airbag 30 having the structure described above rapidly deploys between the elastic support members 27 and the back portion 43 of the covering 41, as compared with a case where an airbag that deploys by the same amounts toward the front side and the back side, a larger pressing force is applied to a portion of the airbag 30 near the elastic support members 27 and a comparatively small pressing force is applied to a portion of the airbag 30 near the back portion 43.

When a vehicle including the vehicle seat described above predicts a rear-end collision, the airbag 30 deploys between the elastic support members 27 and the back portion 43 of the covering 41 as illustrated in FIG. 12B. As the airbag 30 deploys, a portion of the airbag 30 near the elastic support members 27 is pressed forward with a comparative large pressing force, so that the occupant Pf in the front seat 10 is received comparatively securely and backward movement of the occupant Pf is restrained.

The knee Pn of the occupant Pr in the rear seat 60 is comparatively gently received by the deployed airbag 30, so that forward movement of the knee Pn is restrained. Therefore, the upper body Pb of the occupant Pf in the front seat 10 is prevented from receiving an impact force from the knee Pn of the occupant Pr in the rear seat 60. Likewise, the knee Pn of the occupant Pr, who moves forward, is elastically received and protected by the lower portion 30d of the deployed airbag 30.

The airbag 30, after having deployed, may have such a shape that the deployment amount of the airbag 30 in the front-back direction near the back side of the seat back 20 may be greater than that near the front side of the seat back 20. Referring to FIGS. 13A and 13B, this example will be described. FIGS. 13A and 13B are cross-sectional views respectively corresponding to FIGS. 12A and 12B. Elements in FIGS. 13A and 13B corresponding to those in FIGS. 12A and 12B will be denoted by the same numerals, and detailed descriptions of such elements will be omitted.

As illustrated in FIGS. 13A and 13B, the airbag 30, which is disposed in the seat back 20 between the elastic support members 27 and the back portion 43 of the covering 41, includes an airbag body 31. The airbag body 31 is formed by sewing the periphery of a front covering 32 and the periphery of a rear covering 33 together. The front covering 32 is rectangular and is disposed near the elastic support members 27 so as to face the elastic support members 27. The rear covering 33 is disposed near the back portion 43 of the covering 41 so as to face the front covering 32.

FIG. 13B illustrates the airbag 30 in a deployed state. The airbag 30 deploys in such a way that the front covering 32 of the airbag body 31 deploys by a deployment amount Lf in the front-back direction, which is comparatively small, and the rear covering 33 deploys by a deployment amount Lr in the front-back direction, which is considerably greater than the deployment amount Lf of the front covering 32. In other words, the deployment amount of the airbag 30, in the front-back direction, near the back portion 43, which is near the back side of the seat back 20, is greater than that near the elastic support members 27, which is and the front side of the seat back 20.

When the airbag 30 having the structure described above rapidly deploys between the elastic support members 27 and the back portion 43 of the covering 41, as compared with a case where an airbag that deploys by the same amounts toward the front side and the back side, a larger pressing force is applied to a portion of the airbag 30 near the back portion 43 and a comparatively small pressing force is applied to a portion of the airbag 30 near the elastic support members 27.

When a vehicle including the vehicle seat described above predicts a rear-end collision, the airbag 30 deploys between the elastic support members 27 and the back portion 43 of the covering 41 as illustrated in FIG. 13B. As the airbag 30 deploys, a portion of the airbag 30 near the elastic support members 27 is pressed forward with a comparative small pressing force, so that the occupant Pf in the front seat 10 is received comparatively gently and backward movement of the occupant Pf is restrained.

The knee Pn of the occupant Pr in the rear seat 60 is comparatively securely received by the deployed airbag 30 when the occupant Pr is moved forward due to an impact of collision, so that forward movement of the knee Pn is restrained. Therefore, the upper body Pb of the occupant Pf in the front seat 10 is prevented from receiving an impact force from the knee Pn of the occupant Pr in the rear seat 60. As a result, the occupant Pf is protected. Likewise, the knee Pn of the occupant Pr, who moves forward, is elastically received and protected by the lower portion 30d of the deployed airbag 30.

Thus, according to the example described above, the deployment amounts of the airbag, which is disposed in the seat back, toward the front side and toward the back side are made to differ from each other by using a simple structure. Therefore, backward movement of an occupant due to a collision is elastically received, and the occupant can be protected from a rear impact. As a result, during a collision, the airbag can directly protect the occupant and can reduce an impact applied to the occupant from behind the seat back.

In the examples described above, the deployment of the airbag 30 is controlled on the basis of prediction of a collision by a collision predictor. Alternatively, the deployment of the airbag 30 may be controlled on the basis of detection of a collision by a collision detector that detects a collision.

Fourth Example

Figure 14:
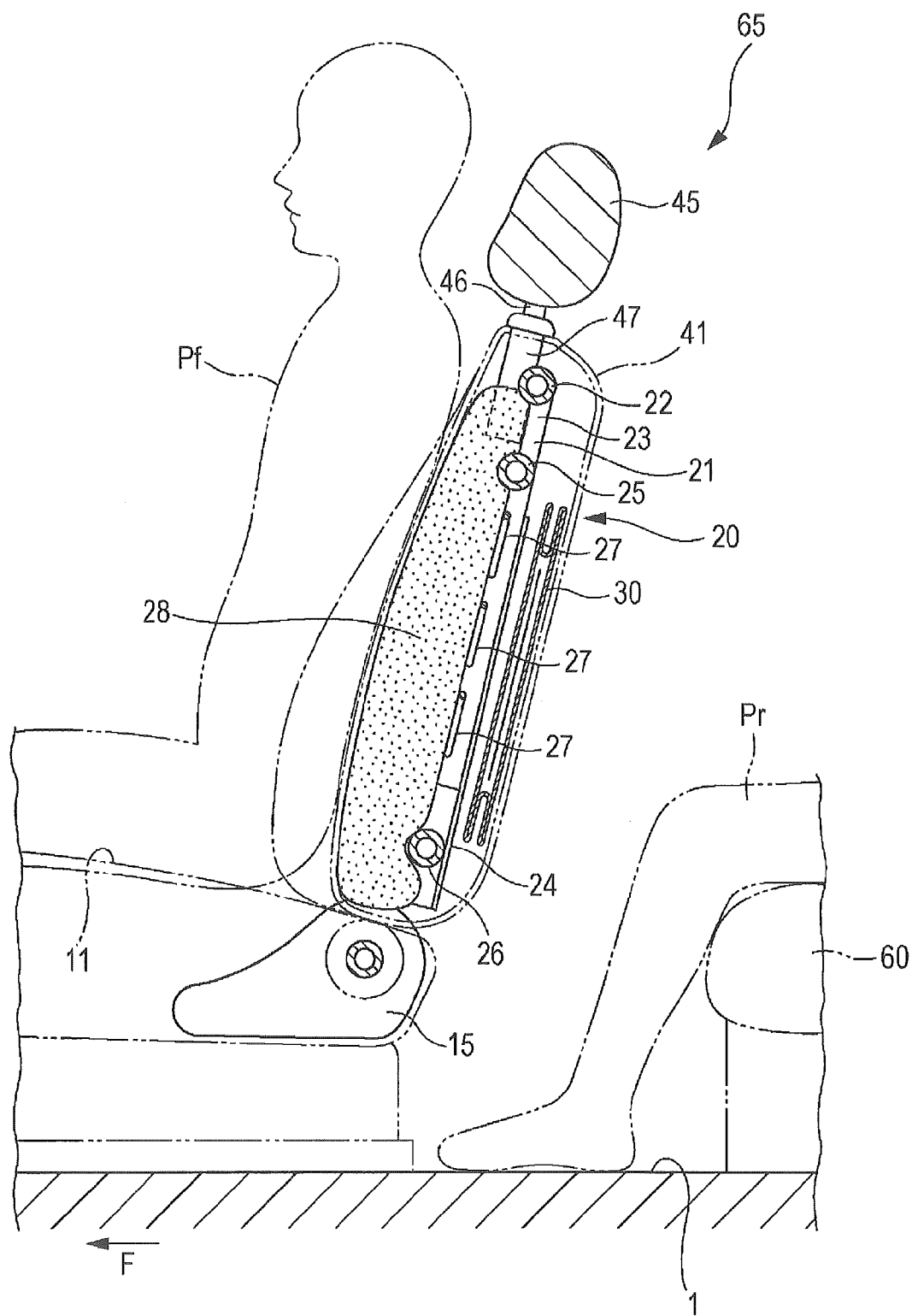
FIG. 14 is a longitudinal sectional view of a vehicle seat according to a fourth example of the present invention.
Figure 15:
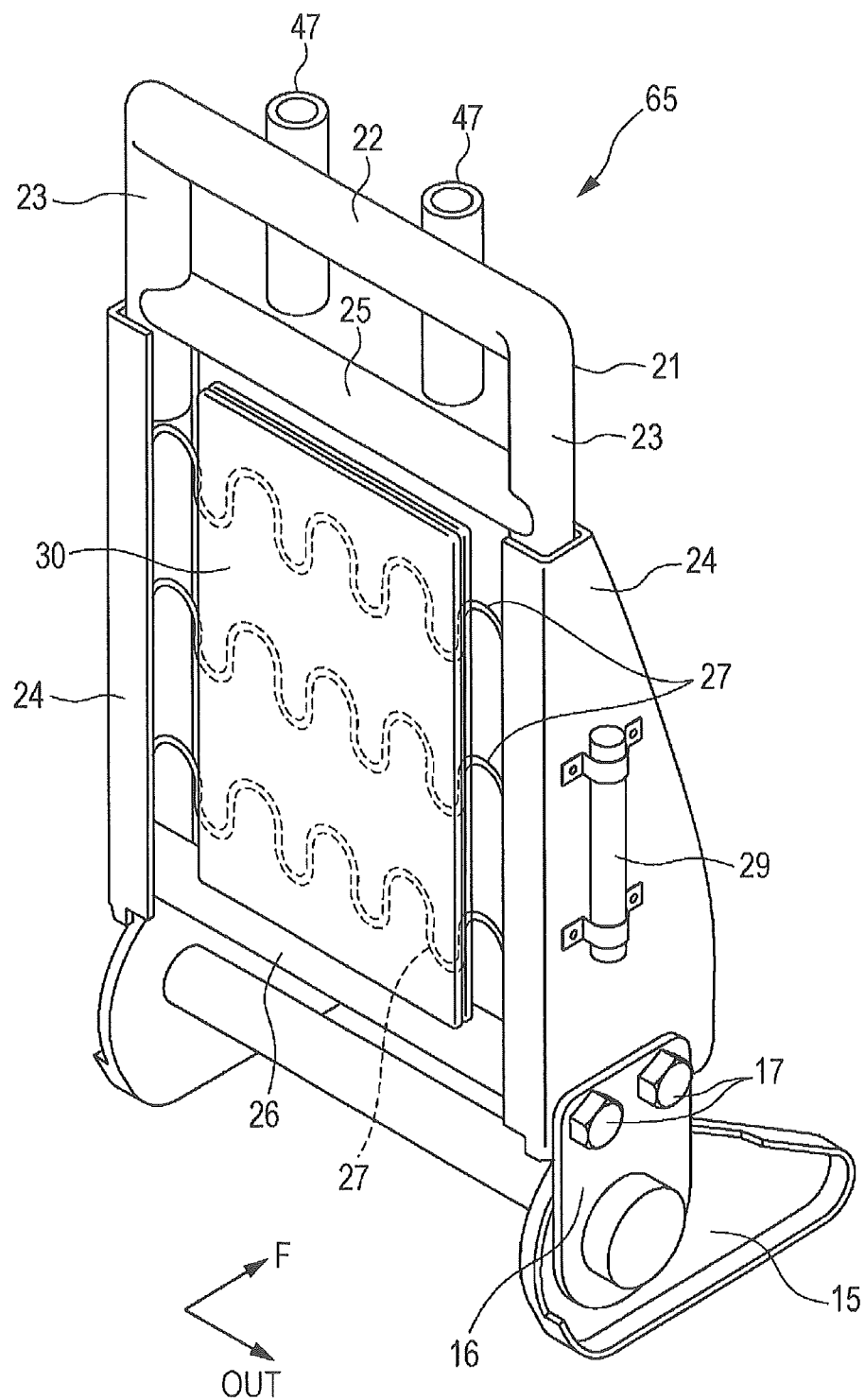
FIG. 15 is a partially cutaway rear perspective view of a vehicle seat according to the fourth example.
Figure 16:
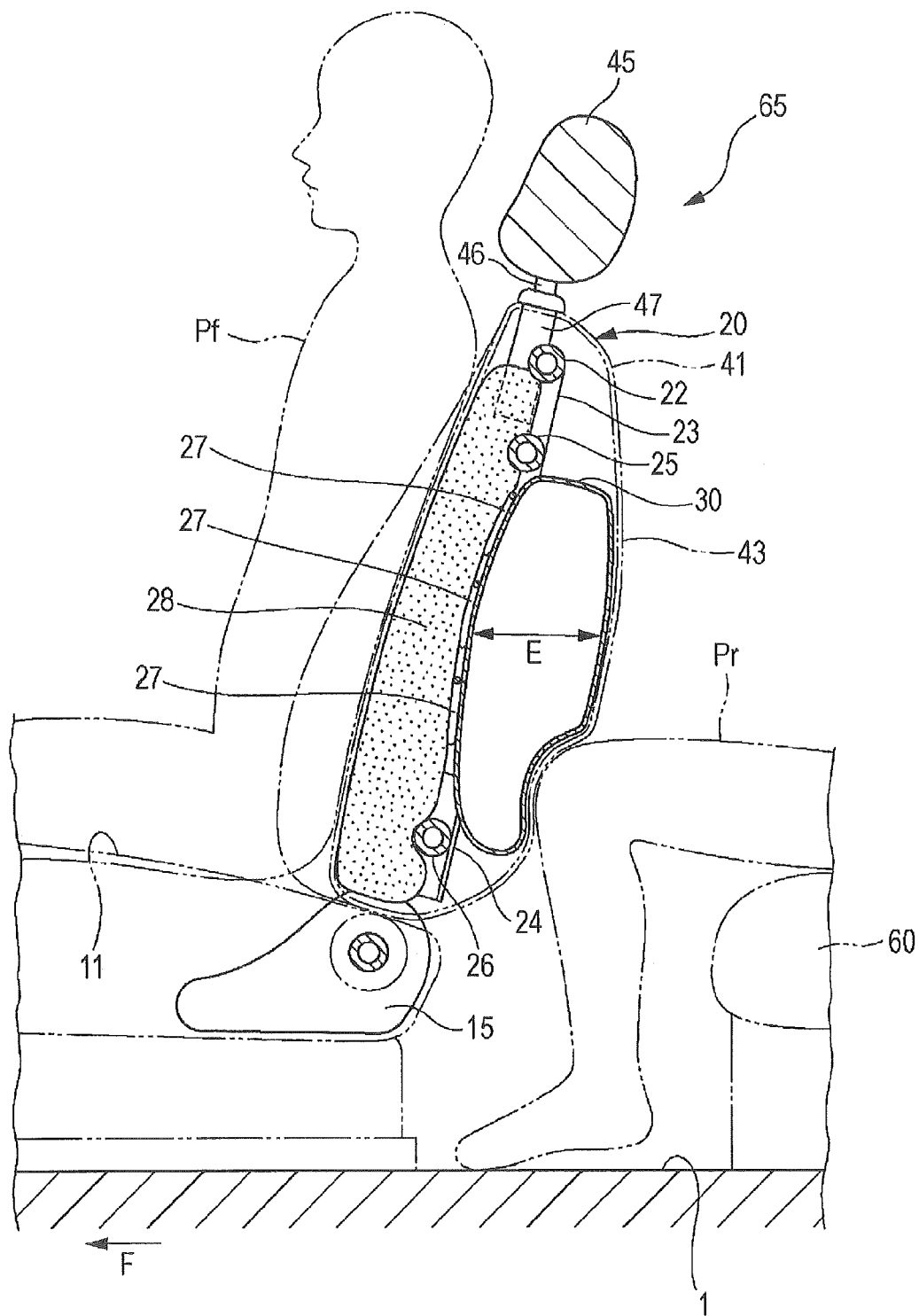
FIG. 16 illustrates how the vehicle seat according to the fourth example operates when a collision occurs.

Referring to FIGS. 14 to 16, a vehicle seat according to a fourth example of the present invention will be described. FIG. 14 is a longitudinal sectional view of the vehicle seat according to the fourth example. FIG. 15 is a partially cutaway rear perspective view of the vehicle seat according to the fourth example. FIG. 16 illustrates how the vehicle seat according to the fourth example operates when a collision occurs. Elements in the fourth example corresponding to those of the first example be denoted by the same numerals, and detailed descriptions of such elements will be omitted.

The forth example differs from the first example in the structure of the airbag.

An airbag 30 according to the fourth example does not include the tethers 34 extending in the airbag 30. The airbag 30 is attached to the back portion 43 of the covering 41 in a state in which the airbag 30 is folded into a flat rectangular shape behind the elastic support members 27. The airbag 30 is disposed between the elastic support members 27 and the back portion 43 of the covering 41. Thus, as described below, in the fourth example, reaction-force-receiving members, which determine the deployment direction of the airbag 30 by receiving a reaction force when the airbag 30 deploys, are the elastic support members 27 extending between the side brackets 24.

Accordingly, as illustrated in FIGS. 14 and 15, the airbag 30, which has a substantially rectangular flat shape in a deflated state, is disposed in a space in the seat back 20 between the elastic support members 27 and the back portion 43 of the covering 41. When the airbag 30 deploys, the seat back 20 covers the front side of the airbag 30 with the elastic support members 27, the seat pad 28, and the covering 41, and covers the back side of the airbag 30 with the covering 41, which is made of a flexible material.

The operation of a vehicle seat 65 having the structure describe above will be described below by using a rear-end collision of a vehicle as an example.

When a vehicle including the vehicle seat 65 according to the fourth example collides with another vehicle coming from behind and the rear-end collision sensor 51 predicts a rear-end collision having a predetermined impact load or more, the controller 50 outputs a drive signal to the inflator 29, and the inflator 29 discharges an inflation gas. Thus, as illustrated in FIG. 16, the airbag 30 deploys instantaneously in a region between the elastic support members 27 and the back side of the seat back 20.

As the airbag 30 deploys, the elastic support members 27, the seat pad 28, the covering 41, and the like, which are made of flexible materials and which covers the front side of the airbag 30, become deformed slightly in the forward direction of the vehicle as illustrated in FIG. 16. The back portion 43 of the covering 41, which is made of a flexible material and which covers the back side of the airbag 30, protrudes and becomes deformed considerably in the backward direction of the vehicle.

The vehicle seat 65 according to the fourth example is characterized in that, due to deformation of the flexible members or flexible materials in front of and behind the airbag 30, the airbag 30 can deploy by a sufficiently large deployment amount E in the front-back direction, and the seat back 20 provides a large impact absorbing distance in the front-back direction of the vehicle.

In other words, as illustrated in FIG. 16, the covering 41 on the front side of the seat back 20, the seat pad 28, the elastic support members 27, and the deployed airbag 30 elastically receive backward movement of the upper body of the occupant Pf in the vehicle seat 65 (front seat) due to an impact of the rear-end collision. Therefore, the upper body of the occupant Pf in the vehicle seat 65 (front seat) is protected from an impact that occurs when the upper body is pressed against the seat back 20 due to the rear-end collision.

An occupant Pr in the rear seat is pressed against the rear seat 60 due to an impact of the rear-end collision and then moved forward due to a rebound. A knee of the occupant Pr in the rear seat, who moves forward due to the rebound, is elastically received by the covering 41 on the back side of the seat back 20 and the deployed airbag 30. Therefore, the upper body of the occupant Pf in the vehicle seat 65 (front seat) is protected from an impact of the knee of the rear seat occupant Pr.

At this time, the airbag 30 deploys stably in the seat back 20, which is located directly behind the upper body of the occupant Pf in the vehicle seat 65, while being restrained to a certain degree due to the inner shape of the seat back 20. Therefore, the airbag 30 can reliably receive backward movement of the upper body of the occupant Pf, absorb an impact due to forward movement of the knee of the occupant Pr in the rear seat. As a result, the occupant Pf can be appropriately protected.

Protection of the occupant Pf is performed by using the dispositions of the airbag 30, which deploys in the seat back 20, and flexible materials (that is, the covering 41, the seat pad 28, the elastic support members 27, and the like) in front of and behind the airbag 30. As a result, the structure is considerably simplified.

Moreover, because the elastic support members 27 serve as reaction-force-receiving members that cause the airbag 30 to deploy in a direction backward from the seat back, the airbag 30 can effectively absorb an impact due to forward movement of the occupant Pr, which the airbag 30 receives from behind the seat back.

In the fourth example, how the vehicle seat 65 functions during a collision is described above by using an example of a rear-end collision of the vehicle. However, the collision is not limited to a rear-end collision. For example, also in a frontal collision, although the order is opposite to that of a rear-end collision, as the airbag 30 deploys, the vehicle seat 65 can first elastically receive an impact due to forward movement of the knee of the occupant Pr in the rear seat, and then can elastically receive backward movement of the upper body of the occupant in the vehicle seat 65.

Fifth Example

Figure 17:
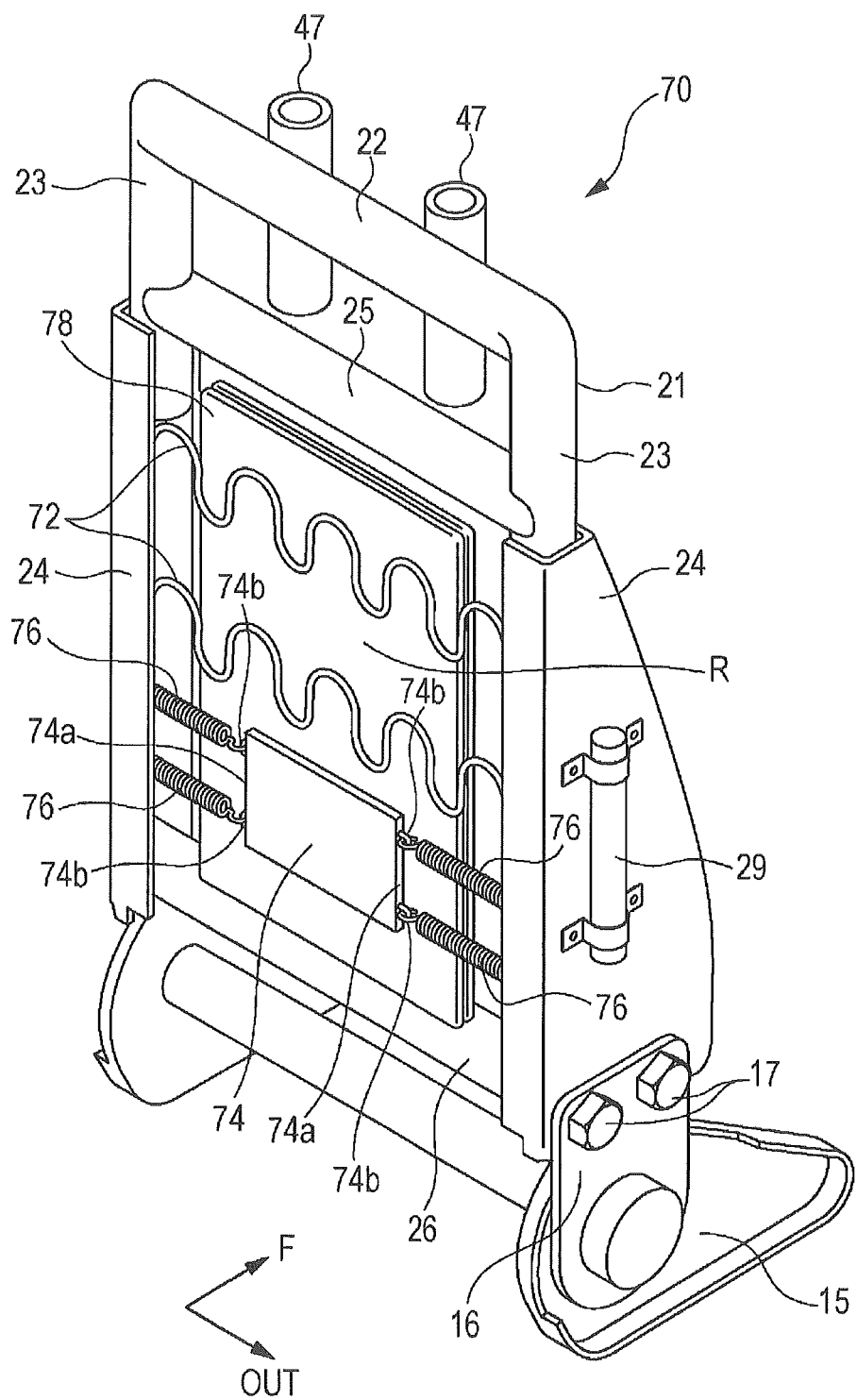
FIG. 17 is a partially cutaway rear perspective view of a vehicle seat according to a fifth example of the present invention.

Referring to FIG. 17, a vehicle seat according to a fifth example of the present invention will be described. In the fourth example, the airbag 30 is made to deploy in the backward direction from the seat back by using the elastic support members 27 as reaction-force-receiving members and disposing the airbag 30 behind the elastic support members 27. As described below, the fifth example has a structure in which the reaction-force-receiving members are partly changed and the deployment direction of the airbag 30 is changed. Elements in the fifth example corresponding to those of the fourth example be denoted by the same numerals, and detailed descriptions of such elements will be omitted.

FIG. 17 is a partially cutaway rear perspective view of a vehicle seat 70 according to the fifth example. As illustrated in FIG. 17, in the vehicle seat 70 according to the fifth example 70, the overall structure of the seat back 20, excluding the structure of reaction-force-receiving members, is the same as that of the fourth example. Therefore, detailed description of the overall structure will be omitted.

In the fifth example, elastic support members 72 are two S-springs made of metal wires. The elastic support members 72 extend between side brackets 24 in an upper part of a substantially rectangular region R surrounded by an upper cross member 25, side frames 23, the side brackets 24, and a lower cross member 26.

In a lower part of the substantially rectangular region R, a flat plate-like lumbar support 74 is supported between the side brackets 24 by tension springs 76. The tension springs 76 are hooked to U-shaped hooks 74b, which are disposed on side portions 74a of the lumbar support 74 and to U-shaped hooks (not illustrated), which are disposed on the side brackets 24.

The lumbar support 74, which is supported by the tension springs 76, presses the spine of the occupant Pf forward through the seat pad 28, so that the occupant Pf (driver) can drive the vehicle in a natural position. In other words, the lumbar support 74 helps the spine of the occupant Pf to maintain an inverted-S-shaped gentle curve and reduces strain on the back of the driver during a long-hour driving.

An airbag 78 is folded into a shape corresponding to that of the substantially rectangular region R in a rear view and is disposed in the substantially rectangular region R. In the fifth example, the airbag 78 is attached to the seat pad 28 at a position in front of the elastic support members 72 and the lumbar support 74.

Accordingly, in the fifth example, the elastic support members 72 and the lumbar support 74 correspond to the reaction-force-receiving members, and the airbag 78 is disposed between the reaction-force-receiving members and the seat pad 28.

With this structure, when the airbag 78 deploys in the seat back 20 due to a collision (such as a rear-end collision), the airbag 78 actively deploys forward by receiving a large reaction force from the elastic support members 72 and the lumbar support 74, which are disposed behind the airbag 78. Therefore, the airbag 78 can more effectively receive and absorb an impact that might press the upper body of an occupant Pf in the front seat against the seat back 20.

Sixth Example

Figure 18:
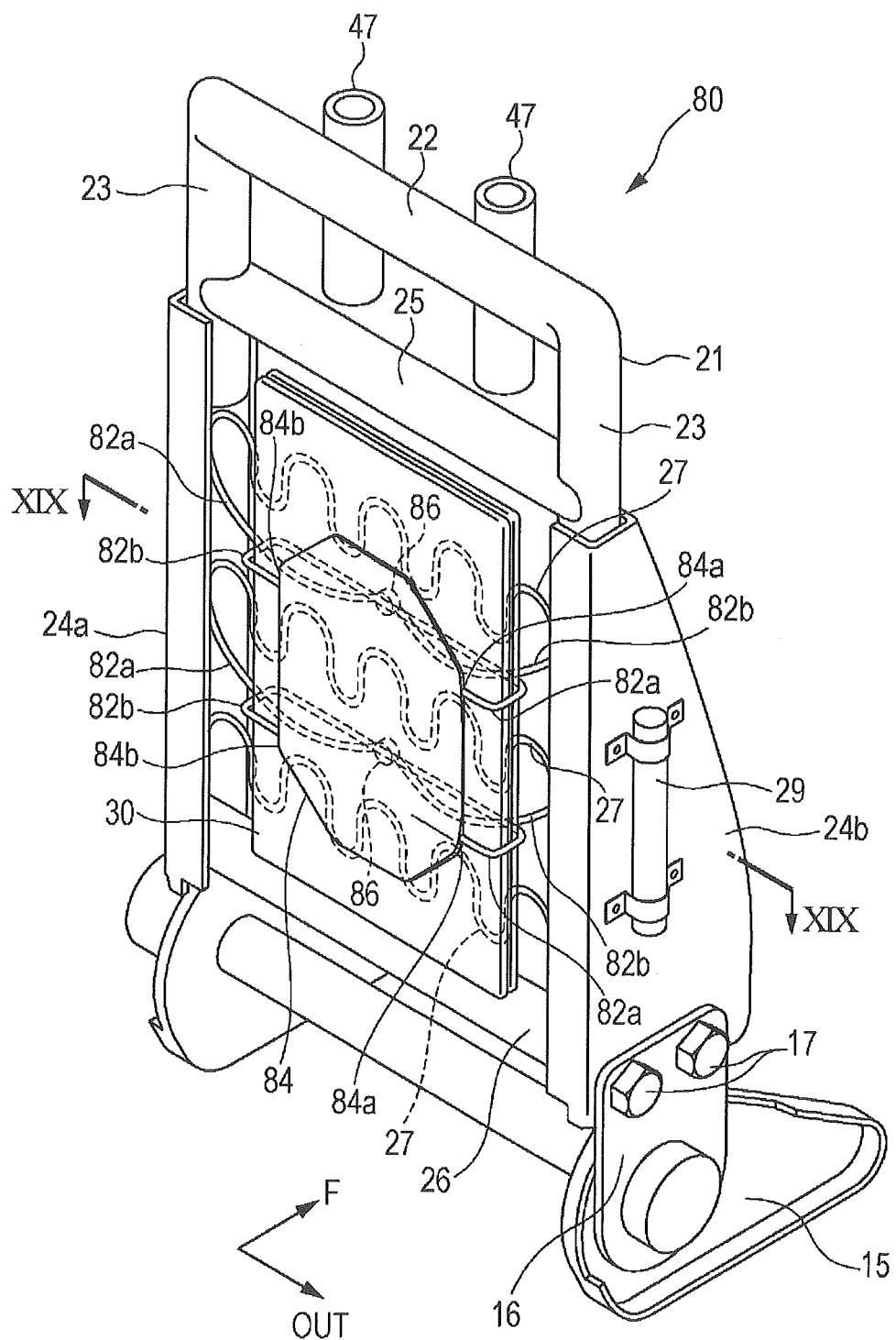
FIG. 18 is a partially cutaway rear perspective view of a vehicle seat according to a sixth example of the present invention.
Figure 19:
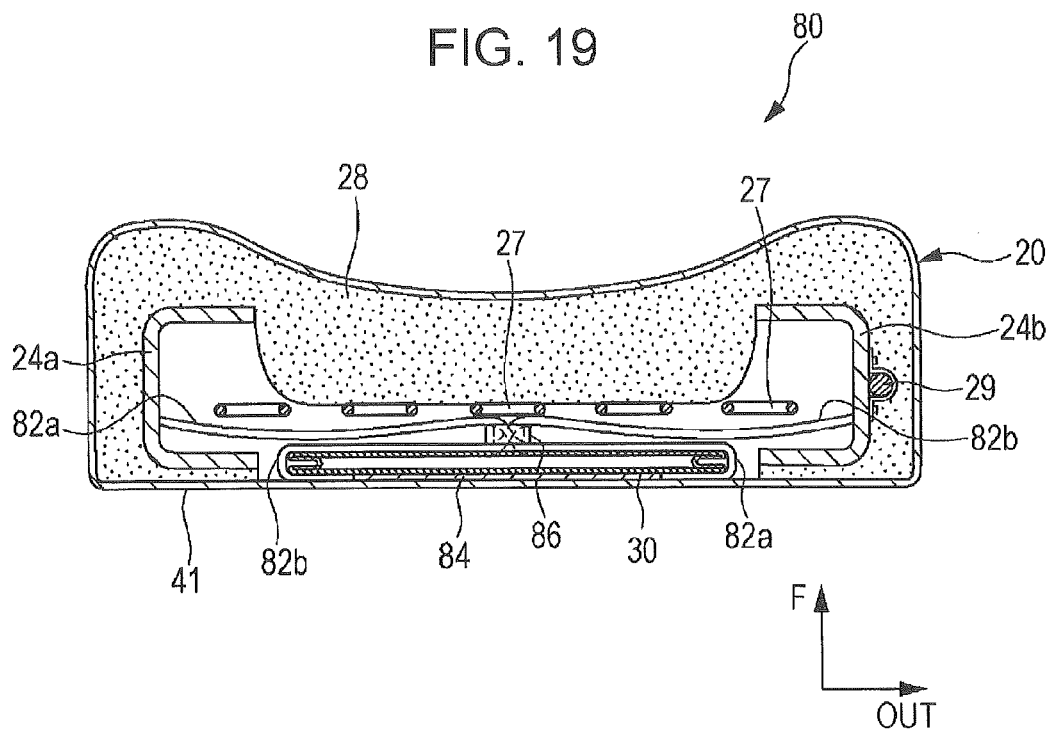
FIG. 19 is cross-sectional view of the vehicle seat taken along line XIX-XIX of FIG. 18.
Figure 20:
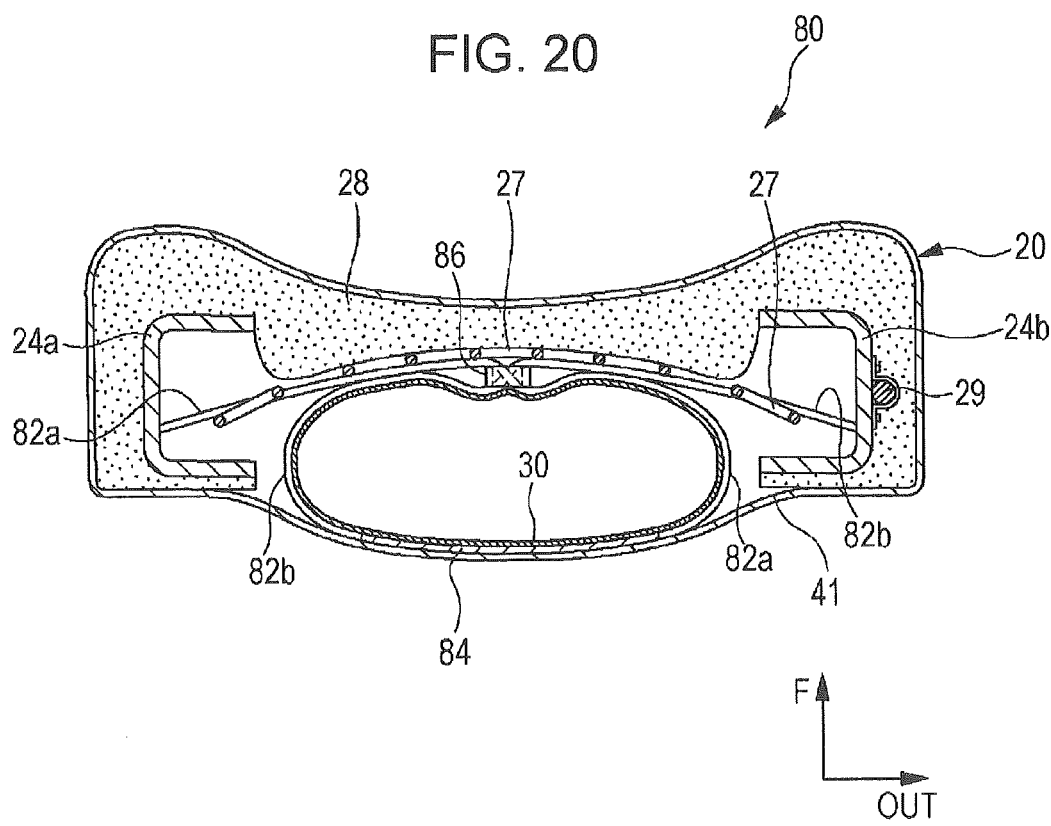
FIG. 20 is a cross-sectional view of a seat back illustrating how the vehicle seat operates when a collision occurs.

Referring to FIGS. 18 to 20, a vehicle seat according to a sixth example of the present invention will be described. FIG. 18 is a partially cutaway rear perspective view of a vehicle seat according to the sixth example of the present invention. FIG. 19 is cross-sectional view of the vehicle seat taken along line XIX-XIX of FIG. 18. FIG. 20 is a cross-sectional view of a seat back illustrating how the vehicle seat operates when a collision occurs. The sixth example differs from the fourth and fifth examples in that not only the elastic support members 27 but also tensile members 82a and 82b and a floating member 84 (described below) are used as reaction-force-receiving members.

In the sixth example, as illustrated in FIGS. 18 and 19, the tensile members 82a and 82b, each of which is made from a rope of a natural fiber or a chemical fiber, are disposed between side brackets 24a and 24b behind the elastic support members 27. The tensile members 82a and 82b floatingly support the floating member 84 in a substantially rectangular region R surrounded by the upper cross member 25, the side frames 23, the side brackets 24a and 24b, and the lower cross member 26 in such a way that the tensile members 82a and 82b extend with a predetermined slack in a normal state.

The floating member 84 is a cloth or a net that has a rectangular shape with diagonally cut corners in a plan view. The back side of the floating member 84 is fixed to the back side of the seat back 20, and the airbag 30 is supported by the front side of the floating member 84. How the tensile members 82a and 82b floatingly support the floating member 84 will be described below.

First ends of two tensile members 82a are fixed to the inside of the side bracket 24a, which is on an inner side in the vehicle-width direction, so as to be separated from each other by a predetermined distance in the height direction. The tensile members 82a extend through a space in front of the airbag 30 toward the side bracket 24b, which is on an outer side in the vehicle-width direction. The tensile members 82a are bent toward the back side of the airbag 30 at side ends of the airbag 30. Second ends of the tensile members 82a are fixed to corners 84a on an outer side of the floating member 84 in the vehicle-width direction.

First ends of two tensile members 82b, which correspond to the two tensile members 82a, are fixed to the inside of the side bracket 24b, which is on the outer side in the vehicle-width direction. The tensile members 82b extend, while crossing the tensile members 82a, through a space in front of the airbag 30 toward the side bracket 24a, which is on the inner side in the vehicle-width direction. The tensile members 82b are bent toward the back side of the airbag 30 at side ends of the airbag 30. Second ends of the tensile members 82b are fixed to corners 84b on an inner side of the floating member 84 in the vehicle-width direction.

As illustrated in FIG. 19, a one-way clutch 86, which has an annular shape and through which the tensile members 82a and 82b extend, is disposed at crossing portions of the tensile members 82a and the tensile members 82b. The one-way clutch 86, including a ratchet (not illustrated), freely allows the tensile members 82a and 82b to pass therethrough in a direction from the side brackets 24a and 24b toward the floating member 84, but does not allow the tensile members 82a and 82b to pass therethrough in the opposite direction (that is, in a direction from the floating member 84 toward the side brackets 24a and 24b).

Accordingly, the floating member 84 is floatingly supported by the side brackets 24a and 24b through the tensile members 82a and 82b, which extend between the side brackets 24a and 24b with a predetermined slack in a normal state, and the airbag 30 is supported in the substantially rectangular region R in a state in which the airbag 30 is surrounded by the tensile members 82a and 82b and the floating member 84.

With this structure, because the airbag 30 is located between the elastic support members 27 and the back side of the seat back 20, when the airbag 30 deploys as the inflator 29 is activated due to a collision, the elastic support members 27 serve as reaction-force-receiving members as illustrated in FIG. 20, and the airbag 30 deploys in the backward direction of the seat back 20.

As the volume of the airbag 30 increases due to the deployment, the slack of the tensile member 82a and 82b are removed, and the tensile members 82a and 82b and the floating member 84 become stretched. Then, the airbag 30 receives reaction forces from the tensile member 82a and 82b and the floating member 84, which have become stretched. Therefore, the deployment of the airbag 30 in a direction toward the back side of the seat back 20 is restrained, and the position of the deployed airbag 30 is controlled to be located between the side brackets 24a and 24b.

In the sixth example, not only the elastic support members 27 but also the tensile members 82a and 82b and the floating member 84 are used as reaction-force-receiving members. Referring to FIGS. 21 and 22, a modification of the sixth example, in which the floating member 84 is not used, will be described below.

FIG. 21 is a cross-sectional view of a vehicle seat 80 according to a modification of the sixth example of the present invention, taken along a line corresponding to line XIX-XIX of FIG. 18. FIG. 22 is a cross-sectional view of a seat back of the vehicle seat 80 according to the modification, illustrating how the vehicle seat 80 operates when a collision occurs. As illustrated in FIG. 21, in the vehicle seat 80 according to the modification, the overall structure of the seat back 20, excluding the structure of reaction-force-receiving members and the structure of the airbag, is the same as that of the sixth example. Therefore, detailed description of the overall structure will be omitted.

In the present modification, as illustrated in FIG. 21, tensile members 90a and 90b are disposed between the side brackets 24a and 24b behind the elastic support members 27. The tensile members 90a and 90b directly and floatingly support an airbag 92 in a substantially rectangular region R (see FIG. 17) surrounded by the upper cross member 25, the side frames 23, the side brackets 24a and 24b, and the lower cross member 26 in such a way that the tensile members 90a and 90*b* extend with a predetermined slack in a normal state. How the tensile members 90*a* and 90*b* floatingly support the airbag 92 will be described below.

The airbag 92 is folded into a shape corresponding to that of the substantially rectangular region R and is disposed in the region R. In the present modification, the airbag 92 is floatingly supported by the tensile members 90*a* and 90*b* between the side brackets 24*a* and 24*b*. The back side of the airbag 92, which is in a floatingly supported state, may be attached to the back side of the seat back 20.

As in the sixth example, first ends of two tensile members 90*a* are fixed to the inside of the side bracket 24*a*, which is on an inner side in the vehicle-width direction, so as to be separated from each other by a predetermined distance in the height direction. As illustrated in FIG. 21, the tensile members 90*a* extend through a space in front of the airbag 92 toward the side bracket 24*b*, which is on an outer side in the vehicle-width direction. The tensile members 90*a* are inserted into the airbag 92 from the front side of the airbag 92 at substantially the midpoint between the side brackets 24*a* and 24*b*. Second ends of the tensile members 90*a* are fixed to side portions 92*a* of the airbag 92 on the outer side in the vehicle-width direction. In this case, the tensile members 90*a* are inserted into the airbag 92 through, for example, orifices (not illustrated) through which a gas is discharged from the inside to the outside of the airbag 92.

First ends of two tensile members 90*b*, which correspond to the two tensile members 90*a*, are fixed to the inside of the side bracket 24*b*, which is on an outer side in the vehicle-width direction. The tensile members 90*b* extend through a space in front of the airbag 92 toward the side bracket 24*a*, which is on the inner side in the vehicle-width direction. The tensile members 90*b* are inserted into the airbag 92 from the front side of the airbag 92 at substantially the midpoint between the side brackets 24*a* and 24*b*. Second ends of the tensile members 90*b* are fixed to side portions 92*b* of the airbag 92 on the inner side in the vehicle-width direction.

A one-way clutch 94 having an annular shape is disposed at crossing portions of the tensile members 90*a* and 90*b*, which is located in front of the airbag 92. The tensile members 90*a* and 90*b* extend through the one-way clutch 94. The one-way clutch 94 freely allows the tensile member 90*a* and 90*b* to pass therethrough in a direction from one end thereof to the other but does not allow the tensile members 90*a* and 90*b* to pass therethrough in the opposite direction.

With this structure, because the airbag 92 is located between the elastic support members 27 and the back side of the seat back 20, when the airbag 92 deploys, the elastic support members 27 serve as reaction-force-receiving members as illustrated in FIG. 22, and the airbag 92 deploys in the backward direction of the seat back 20.

At the same time, the tensile members 90*a* and 90*b* are pulled by a force that is generated as the airbag 92 deploys in the width direction of the seat back 20, so that the tensile members 90*a* and 90*b* become stretched. Then, the airbag 92 receives a reaction force from the tensile member 90*a* and 90*b*, which has become stretched. Therefore, the deployment of the airbag 92 in a direction toward the back side of the seat back 20 is restrained, and the position of the deployed airbag 92 is controlled to be located between the side brackets 24*a* and 24*b*.

As a result, the position of the deployed airbag 92 can be controlled by using a simpler structure, which includes the tensile members 90*a* and 90*b* for floatingly supporting the airbag 92.

Figure 23A:
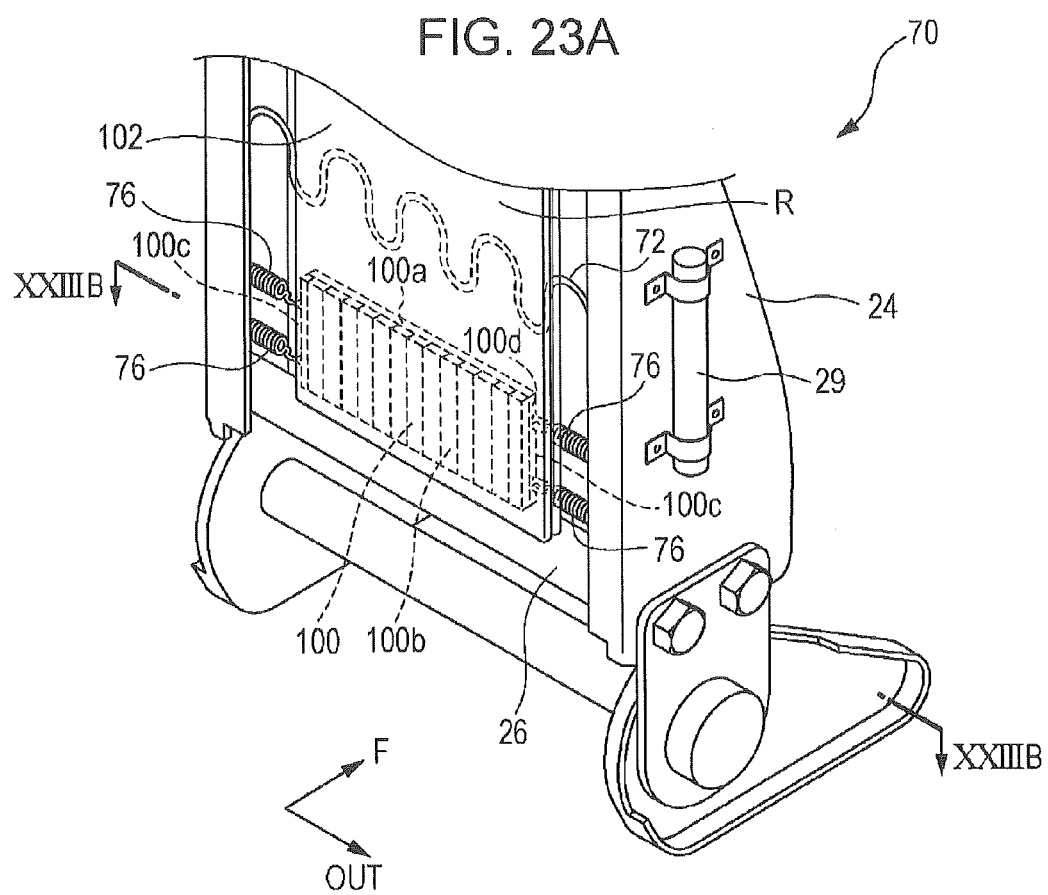
FIG. 23A is a partially cutaway rear perspective view of a lower part of a vehicle seat according to a modification of the fifth example of the present invention.
Figure 23B:
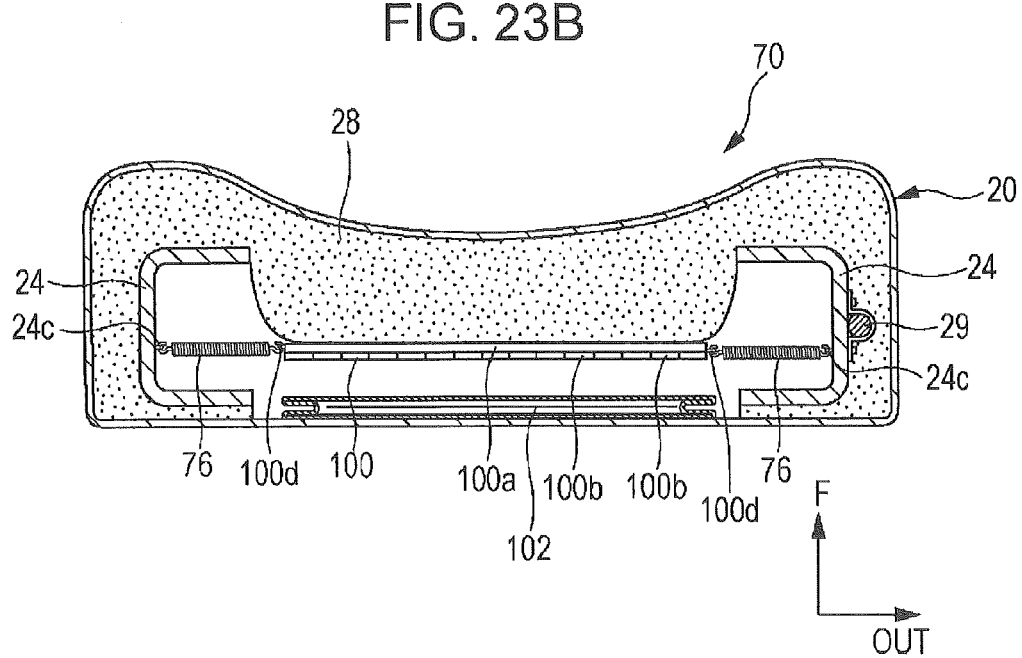
FIG. 23B is a cross-sectional view of the lower part of the vehicle seat taken along line XXIIIB-XXIIIB of FIG. 23A.
Figure 24A:
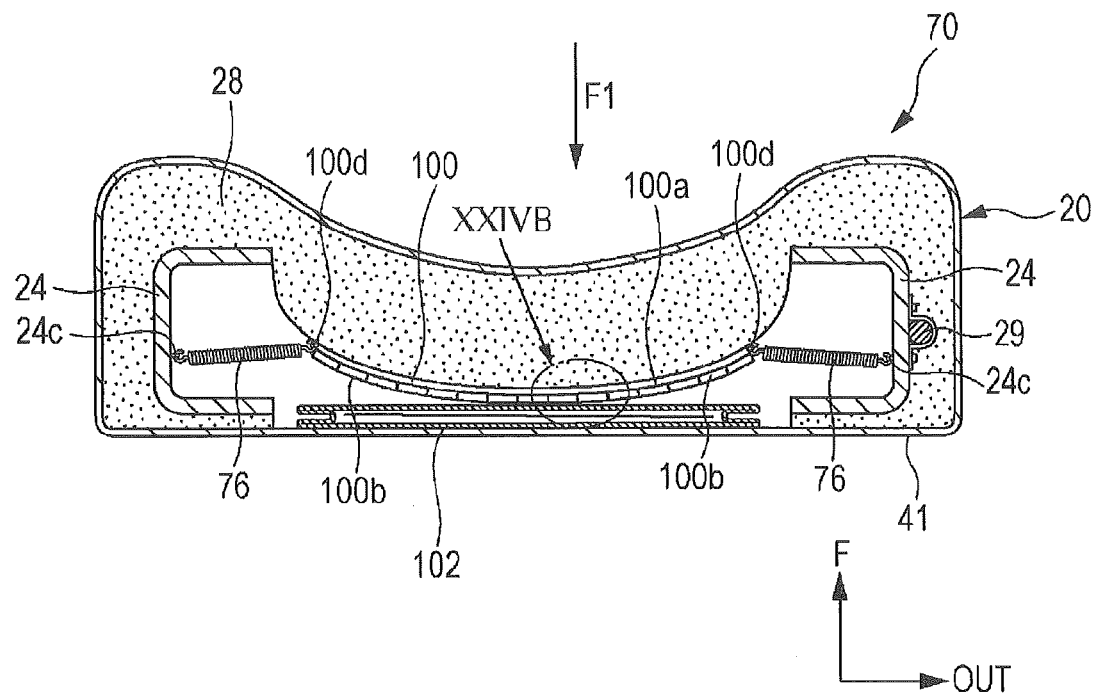
FIG. 24A is a cross-sectional view illustrating an operation of a lumbar support when the lumbar support receives a load from the front side of the vehicle.
Figure 24B:
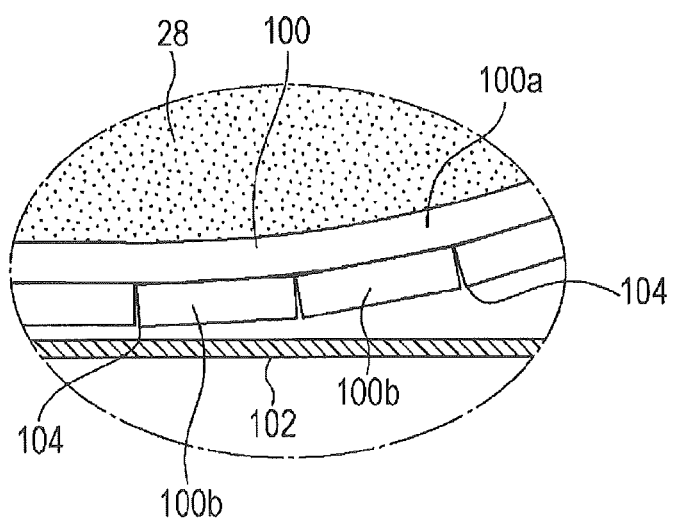
FIG. 24B is a partial enlarged view of a region XXIVB of FIG. 24A.
Figure 25A:
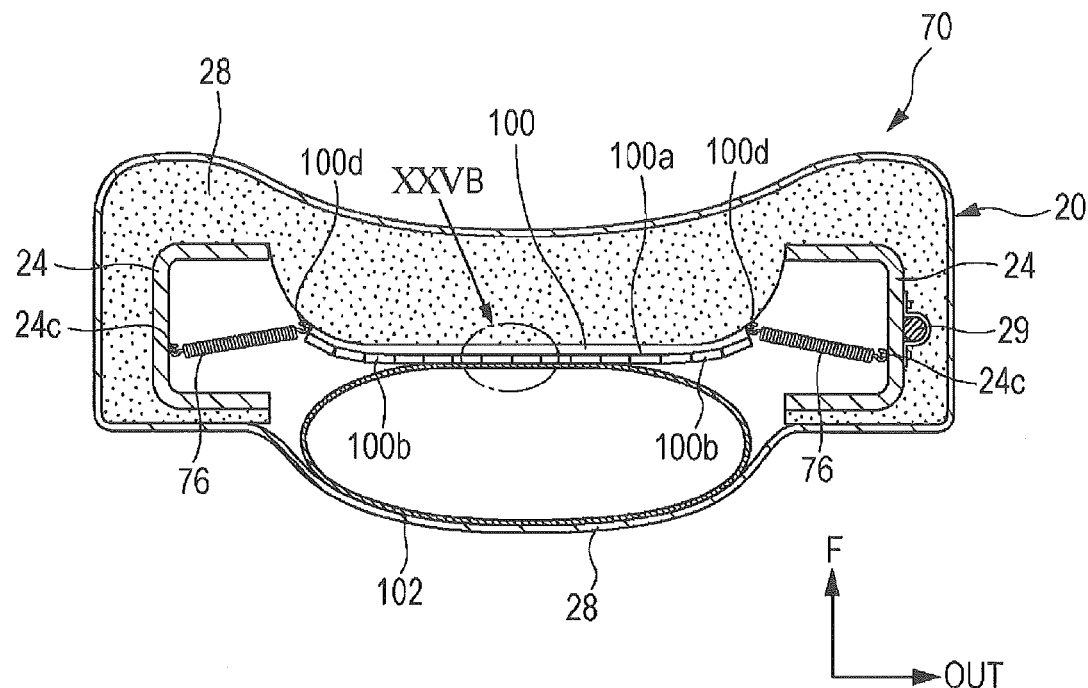
FIG. 25A is a cross-sectional view of a seat back illustrating an operation of the vehicle seat according to the modification when a collision occurs.
Figure 25B:
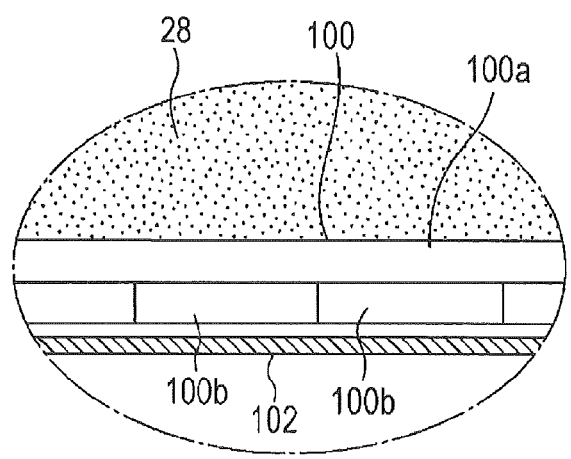
FIG. 25B is a partial enlarged view of a region XXVB of FIG. 25A.

Referring to FIGS. 23A to 25B, a modification of the lumbar support according to the fifth example will be described below. FIG. 23A is a partially cutaway rear perspective view of a lower part of a vehicle seat 70 according to the modification of the fifth example of the present invention, and FIG. 23B is a cross-sectional view of the lower part of the vehicle seat 70 taken along line XXIIIB-XXIIIB of FIG. 23A. FIG. 24A is a cross-sectional view illustrating an operation of a lumbar support when the lumbar support receives a load from the front side of the vehicle, and FIG. 24B is a partial enlarged view of a region XXIVB of FIG. 24A. FIG. 25A is a cross-sectional view of a seat back illustrating an operation of the vehicle seat 70 according to the present modification when a collision occurs, and FIG. 25B is a partial enlarged view of a region XXVB of FIG. 25A.

As illustrated in FIGS. 23A and 23B, in the vehicle seat 70 according to the present modification, the overall structure of the seat back 20, excluding the structure of reaction-force-receiving members and the structure of the airbag, is the same as that of the fifth example. Therefore, detailed description of the overall structure will be omitted.

As in the fifth example (see FIG. 17), the elastic support members 72 are two S-springs made of metal wires. The elastic support members 72 extend between side brackets 24 in an upper part of a substantially rectangular region R surrounded by the upper cross member 25, the side frames 23, the side brackets 24, and the lower cross member 26.

In the present modification, as illustrated in FIGS. 23A and 23B, a lumbar support 100 is a plate-shape member including a resin plate 100*a* and strip-shaped plates 100*b* that are continuously affixed to a back surface of the resin plate 100*a*. The resin plate 100*a* has a substantially rectangular shape in a rear view and has a flexibility to a certain degree. The plates 100*b* (each of which is smaller than the resin plate 100*a*) are stretchable in the height direction. The lumbar support 100 is supported by tension springs 76, which are hooked to U-shaped hooks 100*d* disposed on side portions 100*c* and U-shaped hooks 24*c* disposed on the side brackets 24.

In the present modification, the plates 100*b* are disposed with no distances therebetween. However, as described below, by adjusting the distances between the plates 100*b*, it is possible to set the amount by which the lumbar support 100 can be deformed so as to protrude in the forward direction of the vehicle.

In the present modification, an airbag 102 is folded into a flat rectangular shape corresponding to the substantially rectangular region R in a rear view and is disposed in a deflated state behind the elastic support members 72 and the lumbar support 100.

With this structure, as illustrated in FIG. 24A, while the vehicle is travelling, the lumbar support 100 receives a load F1 generated by the occupant Pf in the front seat 10, who is leaning on the seat back 20, and becomes slightly warped due to the load F1 so as to conform to the shape of the seat pad 28 that is deformed by receiving the load F1 and so as to protrude in the backward direction of the vehicle. As illustrated in FIG. 24B, the lumbar support 100 can be deformed in this way because gaps 104 are formed between adjacent plates 100*b* as the resin plate 100*a*, which has a certain degree of flexibility, becomes deformed.

When the airbag 102 deploys, the airbag 102 is located between the elastic support members 72 and the back side of the seat back 20 of the lumbar support 100. Therefore, as illustrated in FIG. 25A, the elastic support members 72 and the lumbar support 100 function as reaction-force-receiving members, and the airbag 102 deploys toward the back side of the seat back 20.

At this time, as illustrated in FIG. 25B, the lumbar support 100 receives from the airbag 102 a force oriented in the forward direction of the vehicle. However, because adjacent plates 100b interfere with each other, the lumbar support 100 does not become deformed so as to protrude in the forward direction of the vehicle.

In other words, in a normal state, the lumbar support 100 serves to improve the usability of the seat pad 28 by becoming warped and deformed so as to protrude backward by receiving the load F1 from the front side of the vehicle. When the airbag 102 deploys, the lumbar support 100 effectively serves as a reaction-force-receiving member that causes the airbag 102 to deploy in the backward direction of the vehicle.

Seventh Example

Figure 26:
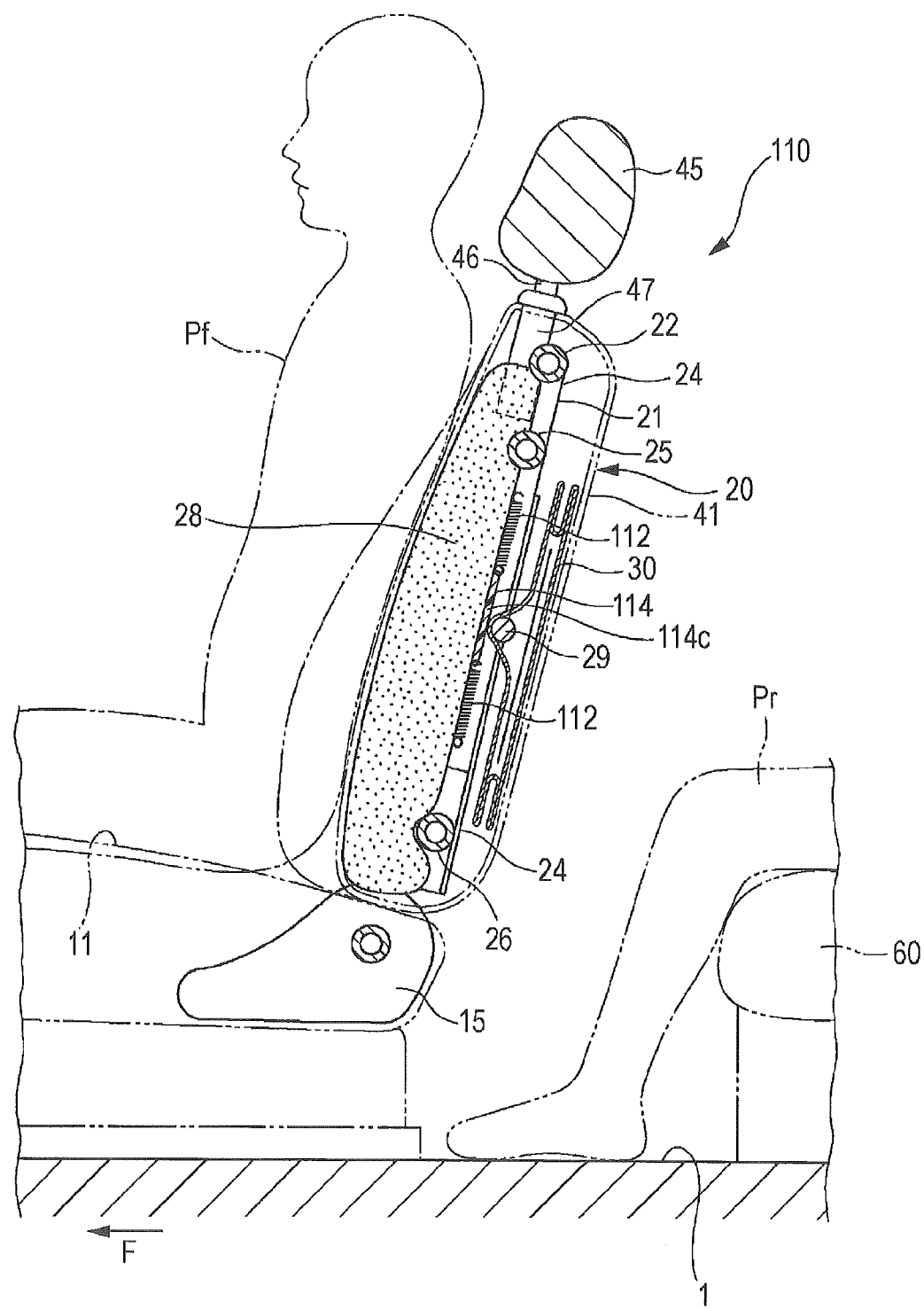
FIG. 26 is a longitudinal sectional view of a vehicle seat according to a seventh example.
Figure 27:
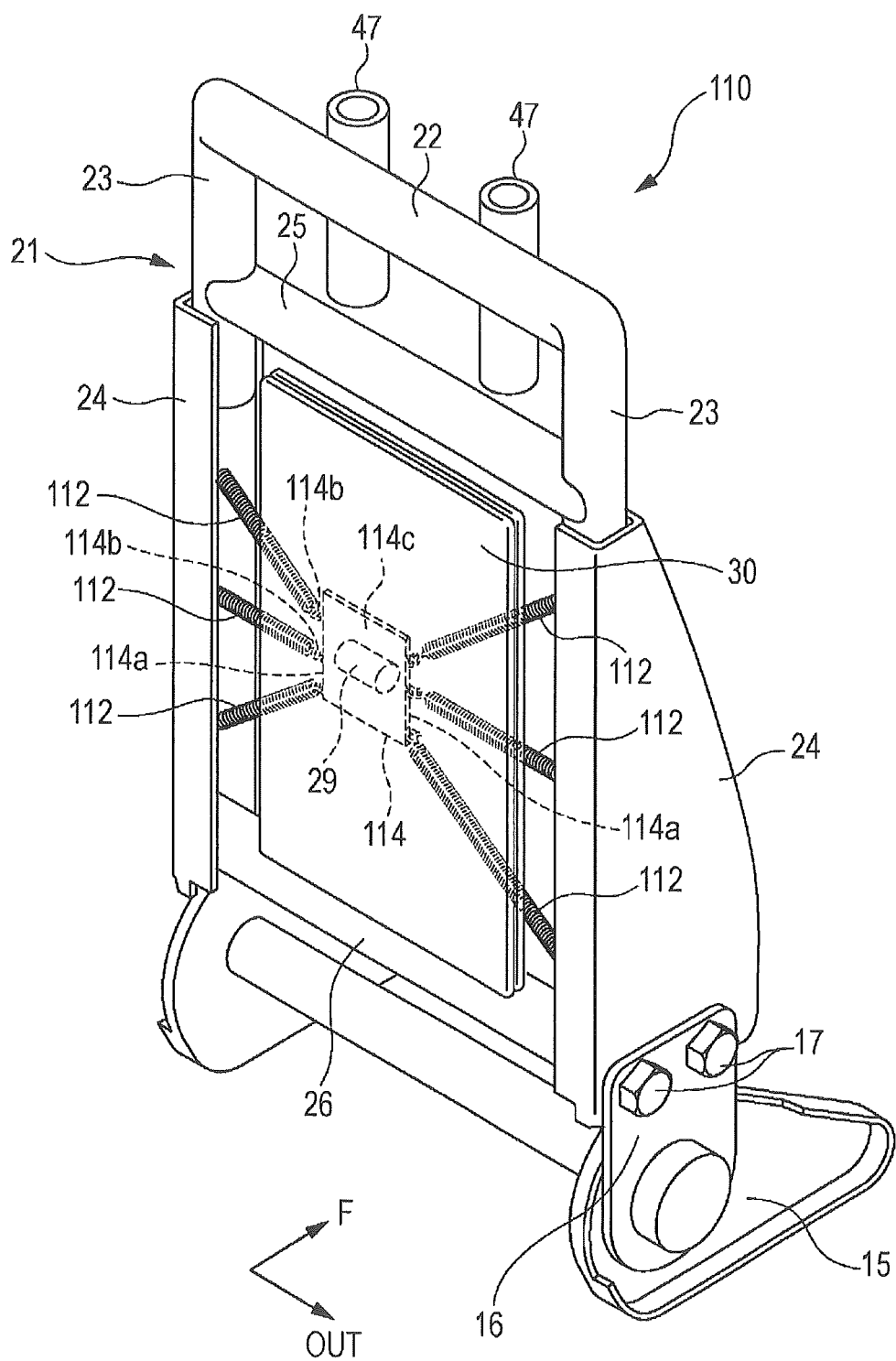
FIG. 27 is a partially cutaway rear perspective view of the vehicle seat according to the seventh example.
Figure 28:
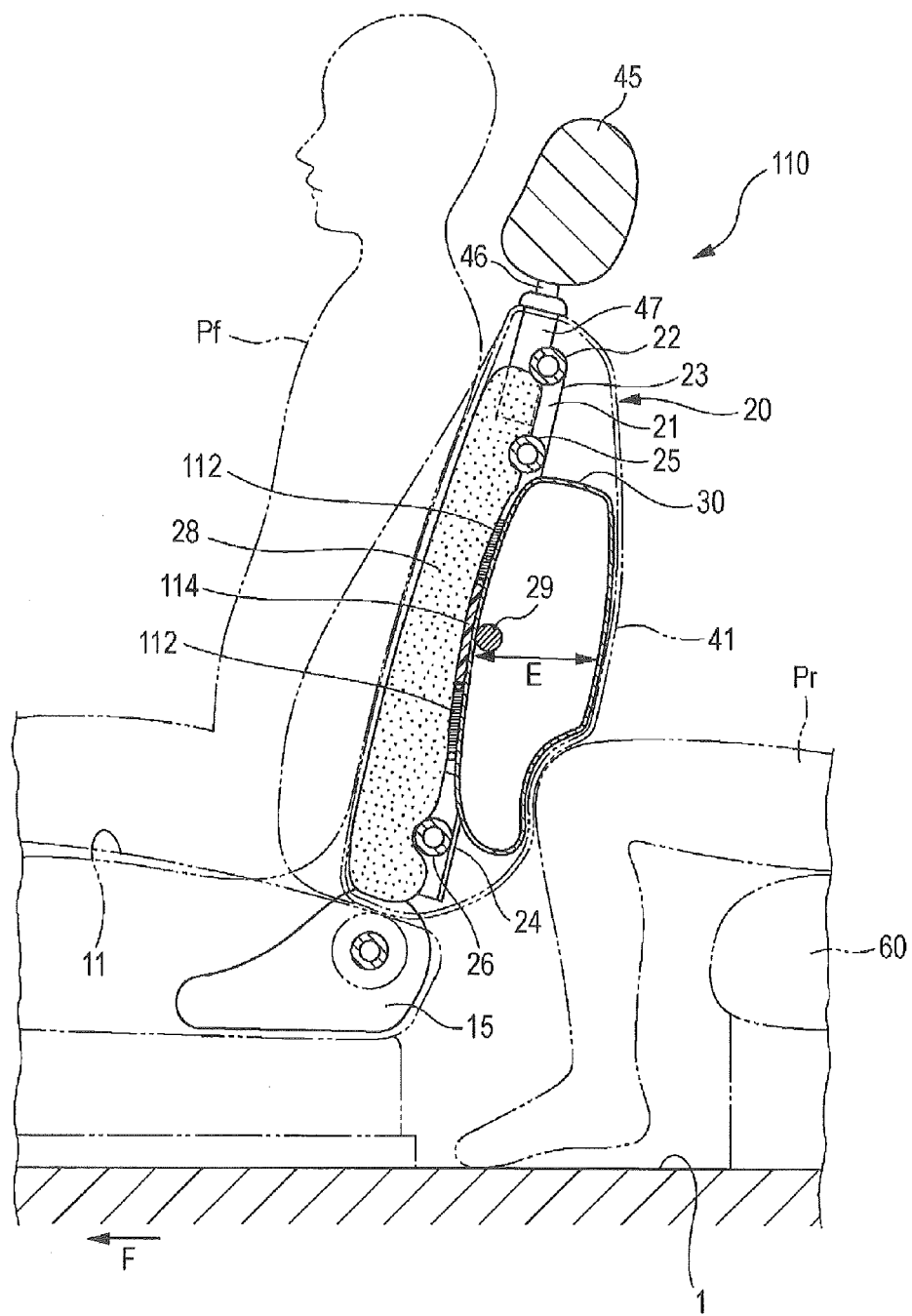
FIG. 28 illustrates how the vehicle seat according to the seventh example operates when a collision occurs.

Referring to FIGS. 26 to 28, a vehicle seat according to a seventh example of the present invention will be described. FIG. 26 is a longitudinal sectional view of a vehicle seat 110 according to the seventh example. FIG. 27 is a partially cutaway rear perspective view of the vehicle seat 110 according to the seventh example. FIG. 28 illustrates how the vehicle seat 110 according to the seventh example operates when a collision occurs.

The seventh example differs from the fourth example in that a floating member is flexibly supported through an elastic support member at a position in front of the airbag 30. This difference will be described below.

As illustrated in FIG. 26, in the seventh example, elastic support members 112 are tension springs, each made of a metal wire, that are hooked to U-shaped hooks 114b disposed on a side portion 114a of floating member 114 and U-shaped hooks (not illustrated) disposed on the side brackets 24. Three elastic support members 112 radially extend from the central position of the floating member 114 to each of the side brackets 24. Instead of the tension spring, S-springs or the like may be used as the elastic support members 112.

As illustrated in FIG. 26, the floating member 114 has a substantially rectangular plate-like shape in a plan view. In the seventh example, the floating member 114 is made of a cured synthetic resin. However, the floating member 114 may be made of a flexible fabric or a net. Even through the floating member is flexible, the elastic support members 112, which extends radially between the floating member and the seat back frame 21, can hold the floating member to maintain a flat shape.

In the seventh example, the elastic support members 112 and the flat plate-like floating member 114 serve as a lumbar support. The floating member 114 presses the upper body of the occupant Pf forward through a seat pad 28 (described below), so that the occupant Pf (driver) can drive the vehicle in a natural position. Moreover, by appropriately adjusting the position of the flat plate-shaped floating member in the height position, the lumbar support helps the spine of the occupant Pf to maintain an inverted-S-shaped gentle curve and reduces strain on the back of the driver during a long-hour driving.

The seat pad 28, which is made of urethane foam or the like, is disposed on the front side of the floating member 114. The airbag 30, which is in a deflated state and folded in a flat rectangular shape, is disposed behind the floating member 114.

With such a structure, the seat back 20 is capable of elastically supporting the upper body, in particular, the chest of the occupant Pf, from behind.

For example, the back surface of the airbag 30 LS supported by the covering 41 or the like in the seat back 20 through engagement units (not illustrated) in such a way that the airbag 30 can deploy. The front surface of the airbag 30 is engaged with a back surface 114c of the floating member 114 in such a way that the airbag 30 can deploy. As described below, the airbag 30 includes a cylindrical inflator 29, which generates a gas that is used to deploy the airbag 30. The airbag 30 instantaneously deploys two-dimensionally when the inflator 29 discharges the gas.

Accordingly, as illustrated in FIGS. 26 and 27, the airbag 30, which has a substantially rectangular flat shape in a deflated state, is disposed in a space in the seat back 20 between the floating member 114 and the covering 41. When the airbag 30 deploys, the seat back 20 covers the front side of the airbag 30 with the floating member 114, which is flexibly supported by the elastic support members 112, and flexible members, including the seat pad 28 and the covering 41. Moreover, the seat back 20 covers the back side of the airbag 30 with the covering 41, which is made of a flexible material.

When a vehicle including the vehicle seat 110 according to the seventh example collides with another vehicle coming from behind and the rear-end collision sensor 51 predicts a rear-end collision having a predetermined impact load or more, the controller 50 outputs a drive signal to the inflator 29, and the inflator 29 discharges an inflation gas. Thus, as illustrated in FIG. 28, the airbag 30 deploys instantaneously in a region between the floating member 114 and the back side of the seat back 20.

As the airbag 30 deploys, the elastic support members 112, the floating member 114, the seat pad 28, the covering 41, and the like, which are made of flexible materials and which cover the front side of the airbag 30, become deformed slightly in the forward direction of the vehicle as illustrated in FIG. 28. The covering 41, which is made of a flexible material and which covers the back side of the airbag 30, protrudes considerably in the backward direction of the vehicle.

As in the fourth example, with the vehicle seat 110 according to the seventh example, due to deformation of the flexible members or flexible materials in front of and behind the airbag 30, the airbag 30 can deploy by a sufficiently large deployment amount E in the front-back direction, and the seat back 20 provides a large impact absorbing distance in the front-back direction of the vehicle.

In other words, as illustrated in FIG. 28, the covering 41 on the front side of the seat back 20, the seat pad 28, the floating member 114 flexibly supported by the elastic support members 112, and the deployed airbag 30 elastically receive backward movement of the upper body of the occupant Pf in the vehicle seat 110 (front seat) due to an impact of a rear-end collision. Therefore, the upper body of the occupant Pf in the vehicle seat 110 (front seat) is protected from an impact that occurs when the upper body is pressed against the seat back 20 due to the rear-end collision.

An occupant Pr in the rear seat is pressed against the rear seat 60 due to an impact of the rear-end collision and then moved forward due to a rebound. A knee of the occupant Pr in the rear seat, which is moved forward due to the rebound, is elastically received by the covering 41 on the back side of the seat back 20 and the deployed airbag 30. Therefore, the upper body of the occupant Pf in the vehicle seat 110 (front seat) is protected from an impact of the knee of the rear seat occupant Pr.

At this time, the airbag 30 deploys stably in the seat back 20, which is located in front of and behind the upper body of the occupant Pf in the vehicle seat 110, while being restrained to a certain degree by the inner shape of the seat back 20. Therefore, the airbag 30 can reliably receive backward movement of the upper body of the occupant Pf, absorb an impact due to forward movement of the knee of the occupant Pr in the rear seat, and reliably protects the occupant Pf.

Protection of the occupant Pf is performed by using the dispositions of the airbag 30, which deploys in the seat back 20, and flexible materials (that is, the covering 41, the seat pad 28, the floating member 114 flexibly supported by the elastic support members 112, and the like) in front of and behind the airbag 30. As a result, the structure is considerably simplified.

Moreover, because the inflator 29 is attached to the floating member 114, which is disposed within the seat back frame 21, with a central portion of the front surface of the airbag 30 therebetween, the inflator 29 can be located at substantially the center of the deployed airbag 30 in the width direction and in the height direction. As a result, a gas can flow in radial directions into the airbag 30 from the central position, and the airbag 30 can deploy rapidly and stably in a state in which the entirety of the airbag 30 is balanced.

In addition, with such dispositions, the inflator 29 can be reliably protected from an impact due to a collision, and the gas can flow into the airbag 30 in a direction toward the knee of the occupant Pr in the rear seat. Therefore, the occupant Pf in the front seat can be protected more appropriately.

Because the floating member 114 is supported by radially extending springs, the floating member 114 can appropriately receive a reaction force generated when the airbag 30 deploys (in other words, movement of the floating member 114 in the height direction and the width direction of the seat back when the floating member 114 receives the reaction force can be strongly suppressed). Therefore, the airbag 30 can deploy backward more stably.

The floating member 114, which is a flat plate-shaped member extending in a direction in which the seat back 20 extends, that is, in a direction substantially parallel to the width direction, can be disposed compactly between the airbag 30 and the seat pad 28. Accordingly, a large airbag deployment space can be provided behind the floating member 114.

The present invention is not limited to the examples described above, and the examples can be modified within the spirit and scope of the present invention. For example, in contrast to the fourth example, the reaction-force-receiving members may be components of the seat back frame 21, such as the upper cross member 25, the lower cross member 26, or the like.

To be specific, for example, the airbag 30 may be attached to the upper cross member 25 and the airbag 30 may be disposed between the upper cross member 25 and the back side of the seat back 20. In this case, when the airbag 30 deploys as a gas flows from the inflator from the upper cross member 25 side, the airbag 30 receives a reaction force from the upper cross member 25 and can deploy backward and downward in the seat back 20. With this structure, an impact applied to the back side of the seat back 20 from behind and below can be effectively absorbed.

As heretofore described, by appropriately disposing the reaction-force-receiving members and the airbag, the airbag can deploy in a direction facing a direction in which an impact is applied, so that such an impact can be more effectively absorbed.

For example, in the seventh example, the elastic support members 112 extend between side brackets 40 via the floating member 114. Alternatively, the elastic support members 112 may extend between the upper cross member 25 and the lower cross member 26 via the floating member 114.

The vehicles of the examples described above each have the vehicle seat (front seat) and the rear seat. However, it is not necessary for the vehicle to have a rear seat. For example, a cargo bed may be disposed behind the vehicle seat. Also in this case, when a cargo on the cargo bed moves forward due to a collision of the vehicle, the airbag 30 deploys and protects an occupant in the vehicle seat from an impact that is generated when the cargo collides with the back surface of the seat back 20.

The invention claimed is:

1. A vehicle seat, comprising:
a seat back covered with a covering;
a seat back frame disposed in the seat back;
an airbag that is disposed in the seat back between a reaction-force-receiving member and a back portion of the covering, and that deploys in the seat back between the reaction-force-receiving member and the back portion of the covering; and
the reaction-force-receiving member that is disposed in back of a seat pad and is disposed in front of the air bag, the reaction-force-receiving member being configured to be deformed, in a forward direction of a vehicle, to protrude into an area that is occupied by the seat pad before the air bag deploys, and the reaction-force-receiving member controls a deployment direction of the airbag by receiving a reaction force generated when the airbag deploys such that, in the forward direction of the vehicle, a width of the seat pad decreases after the air bag is deployed,
wherein the airbag deploys in the seat back in such a way that, after having deployed, the airbag elastically supports an upper body of an occupant and elastically receives an impact force applied to a back surface of the seat back by a body of a seated person on a rear seat, and
wherein the reaction-force-receiving member comprises an elastic support member that is disposed across the seat back frame.

2. The vehicle seat according to claim 1, wherein the airbag is disposed between the elastic support member and the back surface of the seat back.

3. The vehicle seat according to claim 1, wherein the airbag is disposed between the elastic support member and the seat pad that is disposed in front of the elastic support member.

4. The vehicle seat according to claim 3, wherein the airbag is disposed between a lumbar support and the seat pad, the lumbar support being suspended in the seat back frame.

5. The vehicle seat according to claim 1, wherein the reaction-force-receiving member is a floating member that is floatingly supported in the seat back frame via a tensile member fixed to the seat back frame.

6. The vehicle seat according to claim 5, wherein the floating member is floatingly supported by a plurality of the tensile members that cross each other between frames of the seat back frame, the frames facing each other, and wherein the airbag is supported by the floating member at a position between the floating member and crossing portions of the plurality of tensile members.

7. The vehicle seat according to claim 1, wherein the seat back comprises an elastic material such that the back surface of the seat back is configured to protrude backward away from the occupant after the airbag is deployed.

* * * * *